United States Patent
Suzuki

(10) Patent No.: US 7,362,369 B2
(45) Date of Patent: Apr. 22, 2008

(54) IMAGE-TAKING CONTROL APPARATUS FOR CONTROLLING A PLURALITY OF DRIVABLE PARTS OF SAID APPARATUS SUCH THAT EACH DRIVABLE PART FINISHES ITS OPERATION AT SUBSTANTIALLY THE SAME TIME

(75) Inventor: Noboru Suzuki, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 695 days.

(21) Appl. No.: 10/786,990

(22) Filed: Feb. 24, 2004

(65) Prior Publication Data

US 2004/0165079 A1 Aug. 26, 2004

(30) Foreign Application Priority Data

Feb. 25, 2003 (JP) .............................. 2003-046710

(51) Int. Cl.
*G03B 13/00* (2006.01)

(52) U.S. Cl. ...................... 348/357; 348/143; 348/153; 348/169

(58) Field of Classification Search ................ 348/357, 348/347, 352, 169, 143, 154, 155
See application file for complete search history.

(56) References Cited

U.S. PATENT DOCUMENTS

| | | | | |
|---|---|---|---|---|
| 4,897,683 A | * | 1/1990 | Suzuki et al. | 396/136 |
| 5,210,562 A | * | 5/1993 | Miyazawa et al. | 396/49 |
| 5,515,099 A | * | 5/1996 | Cortjens et al. | 348/14.1 |
| 5,614,982 A | * | 3/1997 | Yasukawa | 396/95 |
| 6,507,366 B1 | * | 1/2003 | Lee | 348/352 |
| 6,867,809 B1 | * | 3/2005 | Suzuki | 348/357 |

FOREIGN PATENT DOCUMENTS

JP    58-6163    2/1983

* cited by examiner

*Primary Examiner*—David Ometz
*Assistant Examiner*—Usman Khan
(74) *Attorney, Agent, or Firm*—Morgan & Finnegan, L.L.P.

(57) ABSTRACT

An image-taking control apparatus lets the operations of a plurality of drivable parts, including a first drivable part whose driving speed can be switched only in steps, finish substantially simultaneously. A speed selector selects an operation speed for each of the drivable parts, based on its current position, its target position, and a target operation time. A controller performs lets the operation of the first drivable part start when a waiting time corresponding to a difference between the anticipated operation time for the selected operation speed and the target operation time has passed after a start command time.

9 Claims, 37 Drawing Sheets

FIG. 31

| TABLE No. | 8 BIT A/D VALUE | ZOOMING SPEED (PPS) | TOTAL REGION DRIVE TIME (SEC) | SPEED COMMAND VALUE |
|---|---|---|---|---|
| 8 | 0x79~ | 2000 | 2.500 | 0x7C |
| 7 | 0x70~0x78 | 1300 | 3.846 | 0x74 |
| 6 | 0x69~0x6F | 900 | 5.556 | 0x6C |
| 5 | 0x60~0x68 | 600 | 8.333 | 0x64 |
| 4 | 0x50~0x5F | 400 | 12.500 | 0x57 |
| 3 | 0x41~0x4F | 250 | 20.000 | 0x48 |
| 2 | 0x39~0x40 | 150 | 33.333 | 0x3C |
| 1 | 0x21~0x38 | 100 | 50.000 | 0x2C |
| 0 | 0x00~0x20 | 0 | STOP | 0x00 |

- NUMBER OF DRIVE PULSES OVER ENTIRE MOVABLE REGION OF ZOOM LENS: 5000
- USING 8-BIT A/D CONVERSION
  0x00~0x7F: WIDE DIRECTION
  0x80~0xFF: TELE DIRECTION
  THE ABOVE TABLE SHOWS DIFFERENTIAL DATA WITH 0x80 AS THE CENTER POSITION

IMAGE-TAKING CONTROL APPARATUS FOR CONTROLLING A PLURALITY OF DRIVABLE PARTS OF SAID APPARATUS SUCH THAT EACH DRIVABLE PART FINISHES ITS OPERATION AT SUBSTANTIALLY THE SAME TIME

BACKGROUND OF THE INVENTION

1. Field of the Invention

The present invention relates to image-taking control apparatuses which control the operation of an image-taking device, such as pan-tilt head or the like on which a video camera is mounted. More specifically, the present invention refers to image-taking control apparatuses with which the operation of a plurality of drivable parts in an image-taking device is finished at substantially the same time.

2. Description of Related Art

Image-taking devices in which a video camera capable of a zooming operation and a focusing operation is mounted onto a pan-tilt head capable of a panning operation and a tilting operation are often used for image-taking at remote locations.

When image-taking is performed using such an image-taking device, then an image-taking control apparatus is used which is provided with a shot operation function making it easy to change the image-taking conditions from the current field angle and direction to another field angle and direction. With this shot operation function, the zooming position, focusing position, panning position and tilting position corresponding to the field angle and direction desired by the operator are set (stored) in advance, and it is possible to let the image-taking device move automatically to a stored position by simply ordering the movement to the stored position.

Moreover, image-taking control apparatuses have been proposed which have a synchronized shot operation function allowing changes in field angle and direction which are not irritating, by simultaneously starting and simultaneously stopping the shot operation of a plurality of drivable parts within a preset operation time.

More specifically, the operation speed of all drivable parts is controlled such that the operation times of the other drivable parts are adjusted to the operation time of the drivable part which takes the longest to finish, of the shot operations of the plurality of drivable parts, and the operations of these drivable parts are started simultaneously and finished simultaneously (see Japanese Patent Publication No. S58 (1983)-6163).

However, recently motors whose driving speed can be switched only in steps, such as pulse motors, have come to be used as the driving source of these drivable parts. In this case, sometimes only operation speeds can be selected at which there is a discrepancy to the operation speeds necessary to finish the shot operations of a plurality of drivable parts simultaneously.

In those cases, there will be variations in the end timings of the operations of the plurality of drivable parts, and the characteristics of synchronized shot operation are not attained.

SUMMARY OF THE INVENTION

It is an object of the present invention to provide an image-taking control apparatus with which the operations of a plurality of drivable parts of an image-taking device, including a drivable part whose driving speed can be switched only in steps, can be caused to finish substantially simultaneously.

In order to attain this object, an image-taking control apparatus controls a plurality of drivable parts of an image-taking device, the plurality of drivable parts including a first drivable part whose operation speed can be selected only in steps, such that operations of the plurality of the drivable parts from their current positions to their target positions finish substantially simultaneously.

The image-taking control apparatus according to one aspect of the present invention includes a speed selector selecting an operation speed for each of the drivable parts, based on information on its current position, information on its target positions and information on a target operation time from a start command time at which an operation start of the plurality of drivable parts is commanded until the operations to the target positions finish; and a controller performing such control that each of the drivable parts operates at its corresponding operation speed selected by the speed selector.

The speed selector selects for the first drivable part, from selectable operation speeds of the first drivable part, an operation speed at which the operation to the target position can finish within the target operation time, and the controller calculates an anticipated operation time needed until the operation of the first drivable part to the target position at the operation speed selected by the speed selector finishes, and lets the operation of the first drivable part start when a waiting time corresponding to a time difference between the anticipated operation time and the target operation time has passed after the start command time.

These and further objects and features of the image-taking control apparatus according to the present invention will become apparent from the following detailed description of preferred embodiments thereof taken in conjunction with the accompanying drawings.

BRIEF DESCRIPTION OF THE DRAWINGS

FIG. 31 shows a zooming speed table according to Embodiment 1.

DETAILED DESCRIPTION OF THE PREFERRED EMBODIMENTS

The following is a description of embodiments of the present invention. However, first, the structure and the controls of a pan-tilt zoom image-taking system are explained, which is provided with a synchronized shot operation function for the control of four drivable parts for panning, tilting, zooming and focusing, forming the premise of the present invention. After that, the structure and the controls of pan-tilt zoom image-taking systems according to embodiments the present invention are explained, which are provided not only with a synchronized shot function for panning, tilting and focusing, but also with a pseudo-synchronized shot operation function for zooming.

Premised Technology

Figure 1:
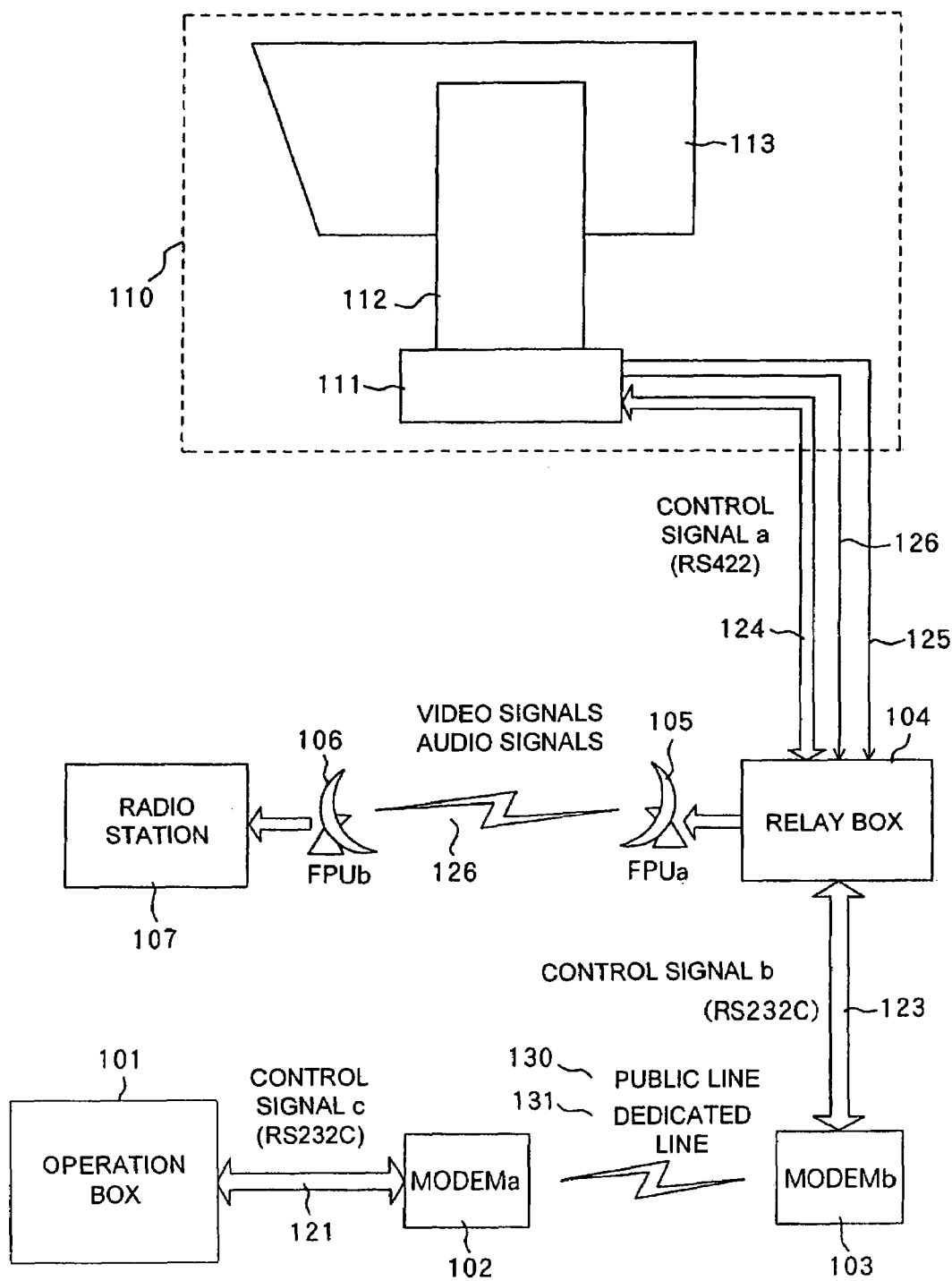
FIG. 1 shows the basic structure of a pan-tilt zoom image-taking system serving as the premised technology of the present invention.

FIG. 1 shows the structure of a pan-tilt zoom image-taking system provided with a synchronization shot operating function.

In FIG. 1, numerical reference 110 denotes a pan-tilt zoom image-taking head unit (image-taking device; hereinafter referred to as "head unit"). The head unit 110 comprises a pedestal 111 supporting the entire head unit 110, a main head 112 to which a control unit for managing and controlling the head unit 110 is mounted (see FIG. 2), a camera unit comprising a video camera and an image-taking lens attached thereto, and a housing 113 on which the camera unit is mounted (see FIG. 2).

A panning mechanism (drivable part: see FIG. 3), which can rotate the main head 112 in the horizontal direction with respect to the pedestal 111, is disposed between the pedestal 111 and the main head 112, and a tilting mechanism (drivable part: see FIG. 4) which can tilt the housing 113 in the vertical direction with respect to the main head 112 is disposed between the main head 112 and the housing 113.

The control unit within the main head 112 communicates control signals a (124) between the pedestal 111 and a relay box 104 via the pedestal 111. Moreover, a video signal 125 and an audio signal 126 taken by the camera unit mounted on the housing 113 are sent via the pedestal 111 to the relay box 104.

Numerical reference 101 denotes an operation box (pan-tilt head operating device) for controlling the head unit 110 and the camera unit mounted on the housing 113 in response to instructions by the operator. This operation box 101 performs the communication of a control signal c 121 with a modem a 102, which communicates with a modem b 103 via a public line 130 or a dedicated line 131. Moreover, the modem b 103 performs the communication of control signals b 123 with the relay box 104.

The video signal 125 and audio signal 126 sent from the camera unit to the relay box 104 are sent by radio communication through an FPU a 105 to an FPU b 106, and then sent from the FPU b 106 to a radio station 107.

Figure 2:
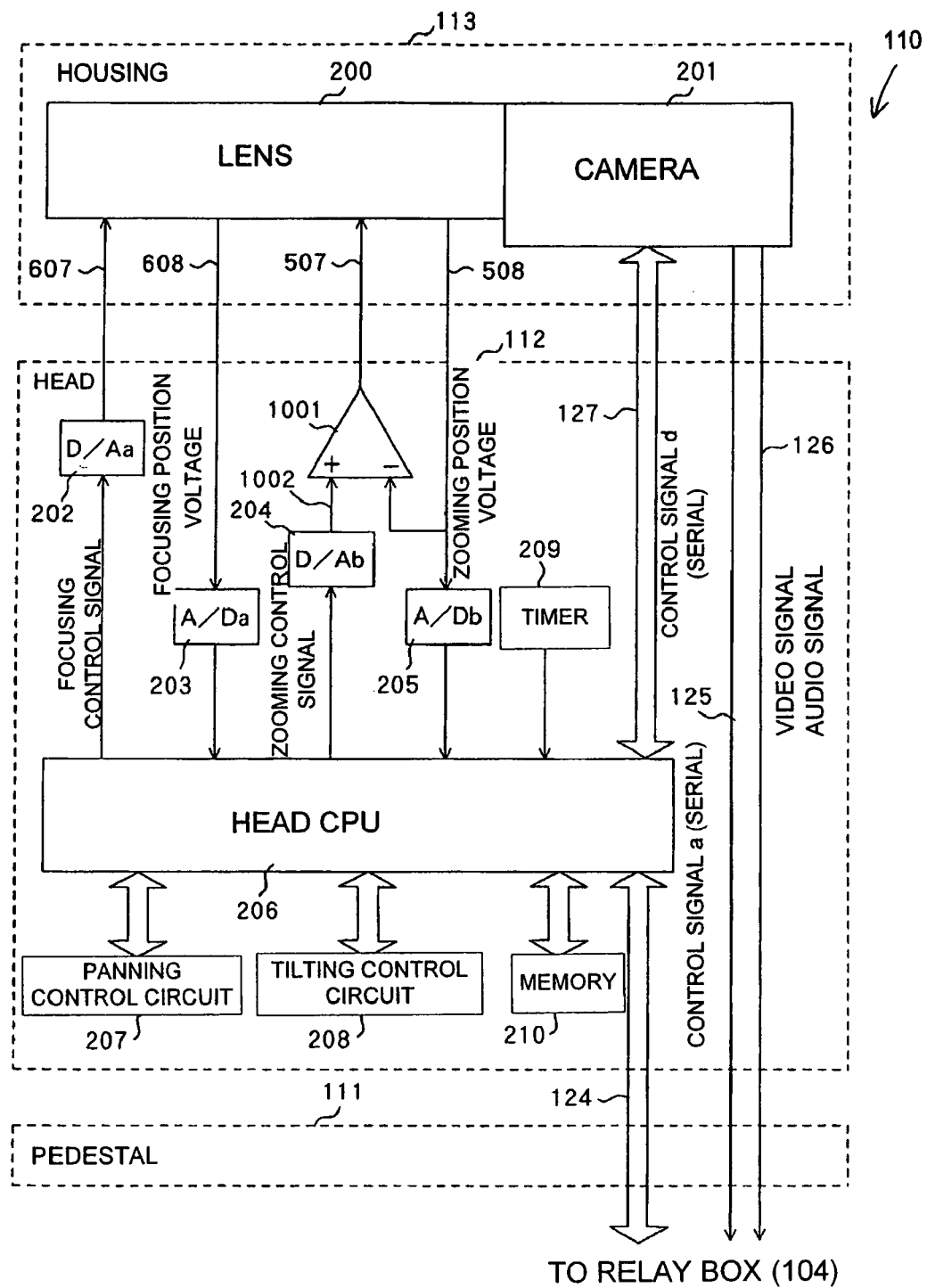
FIG. 2 shows the structure of an electrical circuit of a pan-tilt zoom image-taking head unit in the pan-tilt zoom image-taking system.

Referring to FIG. 2, the following is an explanation of the electric circuit structure of the head unit 110. A camera unit made of an image-taking lens and a video camera 201 is mounted on the housing 113. The control unit inside the main head 112 includes a head CPU 206. The head CPU 206 takes the control timing of the head unit 110 while referencing the clock count of a timer 209, and controls/oversees the various operations of the head unit 110. Furthermore, the head CPU 206 performs arithmetic processing including the storing of shot position data (explained later) to a memory 210 and the reading of the stored shot position data. The head CPU 206 also sends a control signal d 127 to the camera 201, and performs such controls as white balance or gain adjustment of the camera 201.

The control unit is further provided with a panning control circuit 207 and a tilting control circuit 208, which control the panning mechanism and the tilting mechanism in response to control signals from the head CPU 206.

The head CPU 206 also controls the operation of a zooming mechanism (drivable part: see FIG. 5) and a focusing mechanism (drivable part: see FIG. 6) of the image-taking lens 200. The focus control signals of the head CPU 206 are sent via a D/A converter a 202 as a focusing position command voltage 607 to the image-taking lens 200, and control the focusing mechanism. A focusing position voltage 608 indicating the position of the focusing mechanism (that is, a focus lens) is input from the image-taking lens 200 via an A/D converter a 203 into the head CPU 206.

A zooming control signal from the head CPU 206 is input via a D/A converter b 204 as a zooming position command voltage 1002 into the plus terminal of a differential amplifier a 1001. The output of the differential amplifier a 1001 is sent as a zooming speed command voltage 507 to the image-taking lens 200, and controls the zooming mechanism. A zooming position voltage 508 indicating the position of the zooming mechanism (zoom lens) is input from the image-taking lens 200 into the minus terminal of the differential amplifier a 1001, thus forming a feedback circuit for the position control of the zooming mechanism.

The zooming position voltage 508 is also sent via an A/D converter b 205 to the head CPU 206.

The head CPU 206 performs the communication of the control signal a 124 with the relay box 104 and the communication of the control signal d 127 with the camera 201.

Figure 3:
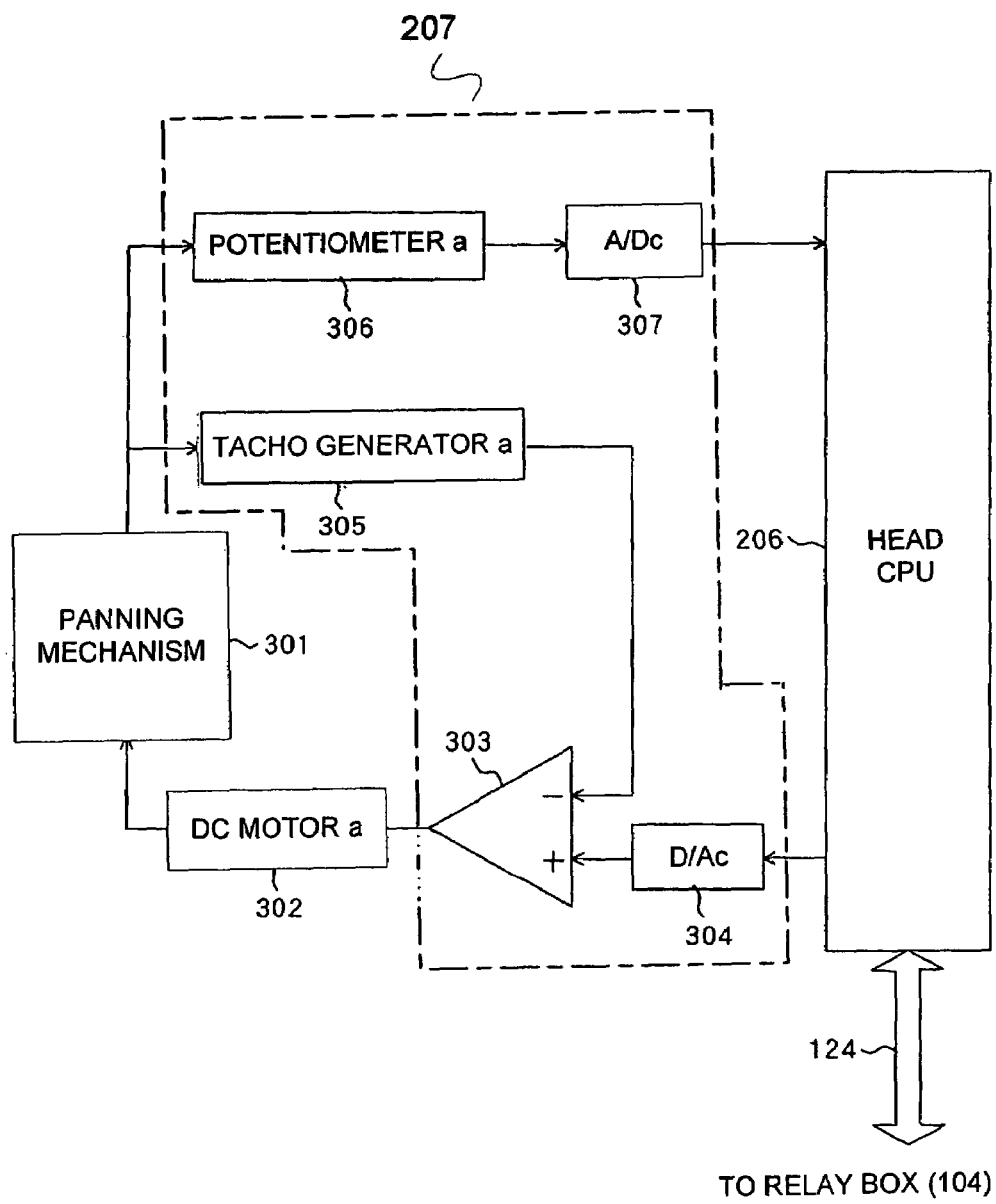
FIG. 3 shows the structure of a panning control circuit in the head unit.

Referring to FIG. 3, the following is an explanation of the panning control circuit 207. The head CPU 206 inputs a control signal via a D/A converter c 304 into the plus terminal of a motor driver a 303. The output from the motor driver a 303 is input as a driving signal into the DC motor a 302, which serves as a driving source of the panning mechanism 301, driving the DC motor a 302. Thus, the panning mechanism 301 is operated rotatively, and the main head 112 and the housing 113 (camera unit) shown in FIG. 1 perform a panning operation. The driving speed of the panning mechanism 301 (DC motor a 302) can be controlled in non-steps according to the control signal.

The panning mechanism 301 is connected to a potentiometer a 306 detecting a rotation position (panning position) of the panning mechanism 301, and a tacho generator a 305 detecting the rotation speed (panning speed) of the panning mechanism 301. The output of the potentiometer a 306 is input via an A/D converter c 307 into the head CPU 206. The output of the tacho generator a 305 is input into the minus terminal of the motor driver a 303, thus forming a feedback circuit for rotation speed control of the panning mechanism 301.

Moreover, the head CPU 206 communicates a signal for the control of the panning mechanism 301 as one piece of the control signal 124 to the relay box 104.

Figure 4:
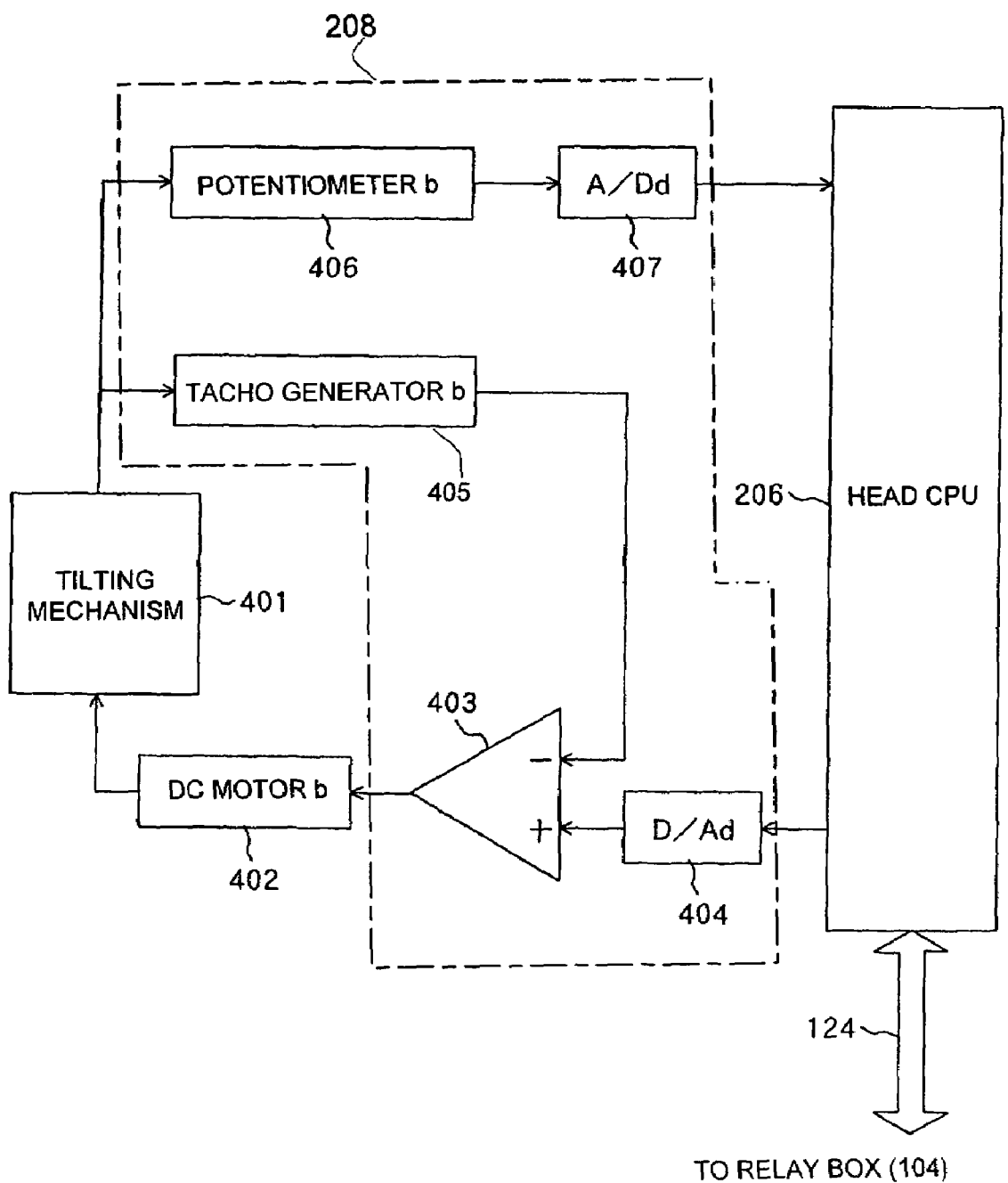
FIG. 4 shows the structure of a tilting control circuit in the head unit.

Referring to FIG. 4, the following is an explanation of the tilting control circuit 208. The head CPU 206 inputs a control signal via a D/A converter d 404 to the plus terminal of a motor driver b 403. The output from the motor driver b 403 is input as a driving signal into a DC motor b 402, which serves as a driving source of the tilting mechanism 401, driving the DC motor b 402. Thus, the tilting mechanism 401 is operated rotatively, and the housing 113 (camera unit) shown in FIG. 1 performs a tilting operation. The driving speed of the tilting mechanism 401 (DC motor b 402) can be controlled in non-steps according to the control signal.

The tilting mechanism 401 is connected to a potentiometer b 406 detecting a rotation position (tilting position) of the tilting mechanism 401, and a tacho generator b 405 detecting the rotation speed (tilting speed) of the tilting mechanism 401. The output of the potentiometer b 406 is input via an A/D converter d 407 into the head CPU 206. The output of the tacho generator b 405 is connected to the minus terminal of the motor driver b 403, thus forming a feedback circuit for rotation speed control of the tilting mechanism 401. Moreover, the head CPU 206 communicates a signal for the control of the tilting mechanism 401 as one of the control signals 124 to the relay box 104.

Figure 5:
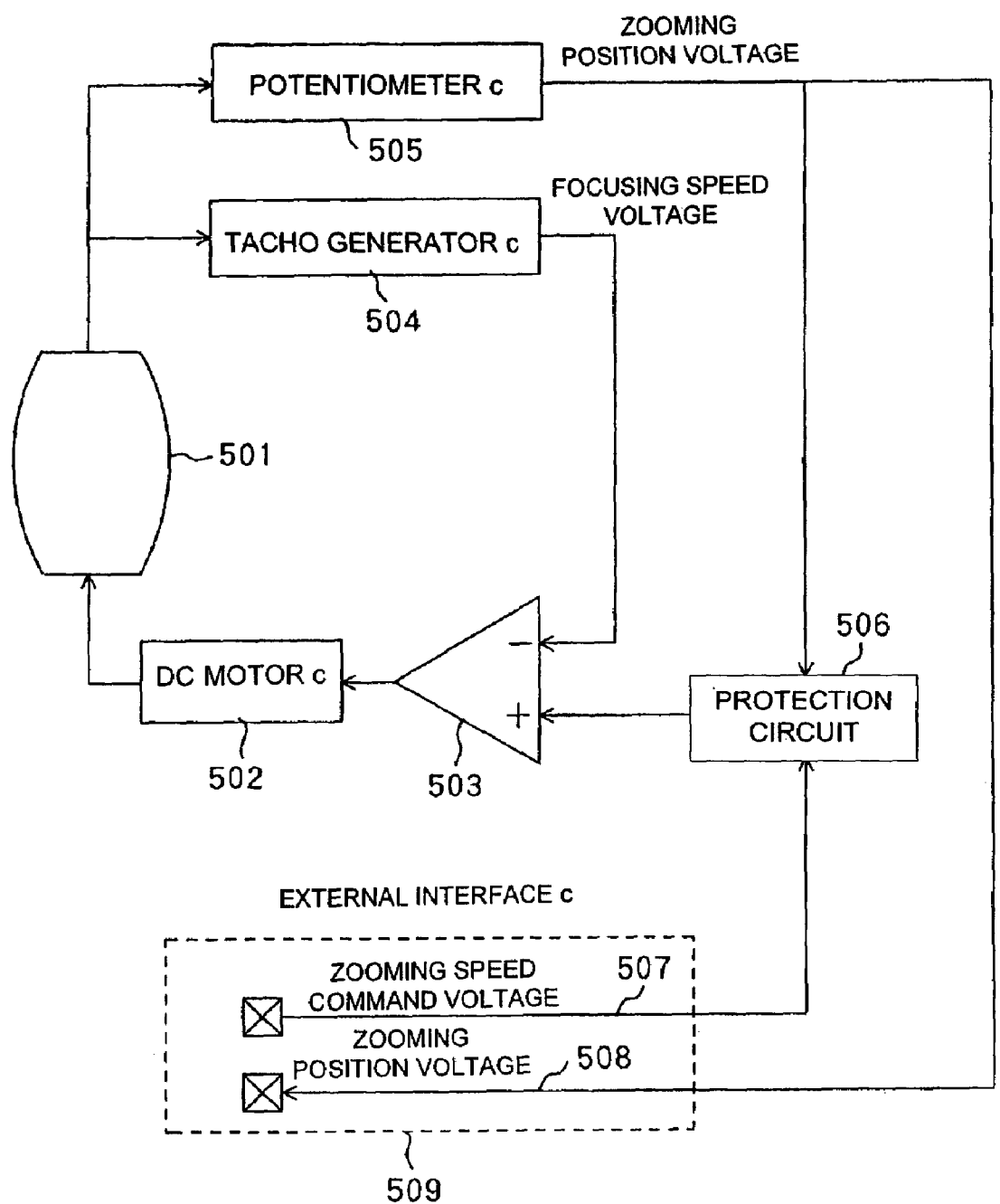
FIG. 5 shows the structure of a zooming control circuit in the head unit.

Referring to FIG. 5, the following is a description of a zoom lens control circuit with which the image-taking lens 200 is provided. This zoom lens control circuit is configured to perform the speed control of a zoom lens 501.

At an external interface c 509, the zooming speed command voltage 507 is input from the control unit in the main head 112, and the zooming position voltage 508 from a potentiometer c 505 (described later) is output.

The zooming speed command voltage 507 is input into a protection circuit 506. This protection circuit 506 ensures that the zoom lens 501 is not driven beyond the telephoto end in the telephoto direction when inputting a zooming speed command voltage 507 by which the zoom lens 501 is driven in the telephoto direction in a case where the zoom lens 501 is positioned at the telephoto end, and also ensures that the zoom lens 501 is not driven beyond the wide-angle end in the wide-angle direction when inputting the zooming speed command voltage 507 at which the zoom lens 501 is driven in wide-angle direction in a case where the zoom lens 501 is positioned at the wide-angle end.

The output of the protection circuit 506 is input into the plus terminal of a motor driver c 503, and the output of the motor driver c 503 is input as the driving signal into a DC motor c 502. The driving force of the DC motor c 502 is transmitted to the zoom lens 501 (including its driving mechanism). The driving speed of the zoom lens 501 (DC motor c 502) can be controlled in non-steps according to the zooming speed command voltage 507.

The zoom lens 501 is connected to a potentiometer c 505 detecting a position (zooming position) of the zoom lens 501, and a tacho generator c 504 detecting the moving speed of the zoom lens 501. The output of the tacho generator c 504 is input into the minus terminal of the motor driver c 503, thus forming a feedback circuit for speed control of the zooming lens 501. Moreover, the output of the potentiometer c 505 is input as the zooming position voltage into the protection circuit 506, and output as the zooming position voltage 508 to the external interface c 509.

Figure 6:
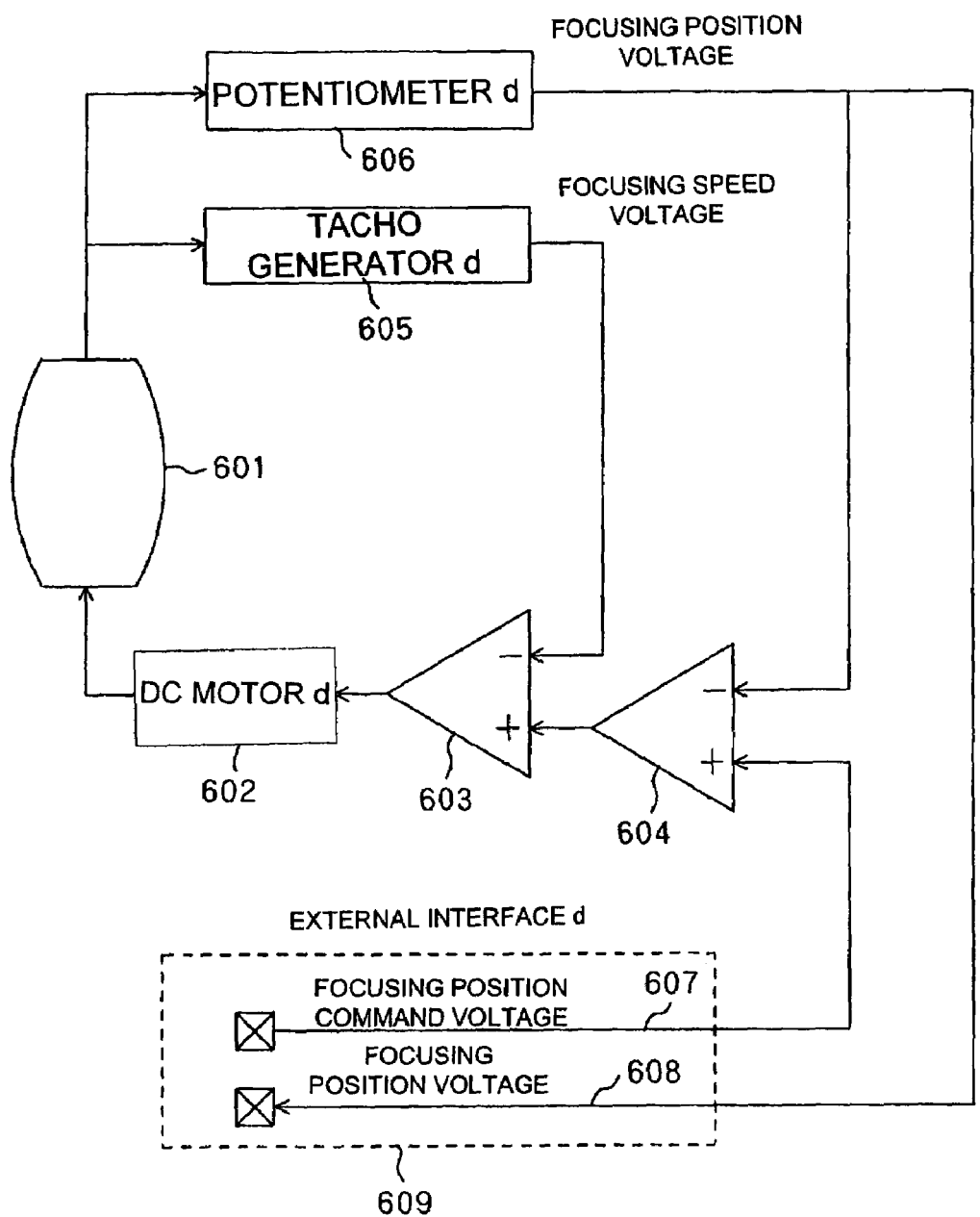
FIG. 6 shows the structure of a focusing control circuit in the head unit.

Referring to FIG. 6, the following is an explanation of a focus lens control circuit with which the image-taking lens 200 is provided. This focus lens control circuit is configured to perform the position control of the focus lens 601.

The focusing position command voltage 607 is input from the control unit in the main head 112 into an external interface d 609, and the focusing position voltage 608 is output from a potentiometer d 606, which is described later.

The focusing position command voltage 607 is input into the plus terminal of a differential amplifier d 604. The output of the differential amplifier d 604 is input into the plus terminal of a motor driver d 603, and the output of the motor driver d 603 is input as a driving signal into a DC motor d 602. The driving force of the DC motor d 602 is transmitted to the focus lens 601 (including its driving mechanism). The driving speed of the focus lens 601 (DC motor d 602) can be controlled in non-steps according to the focusing speed command voltage 607.

The focus lens 601 is connected to a potentiometer d 606 detecting a position (focusing position) of the focus lens

601, and a tacho generator d 605 detecting the moving speed of the focus lens 601. The output of the tacho generator d 605 is input into the minus terminal of the motor driver d 603, thus forming a feedback circuit for speed control of the focus lens 601. The output of the potentiometer d 606 is input as the focusing position voltage into the minus terminal of the differential amplifier d 604, and output as the focusing position voltage 608 to the external interface d 609. By inputting the focusing position voltage into the minus terminal of the differential amplifier d 604, a feedback circuit for positional control of the focusing lens 601 is formed.

Figure 7:
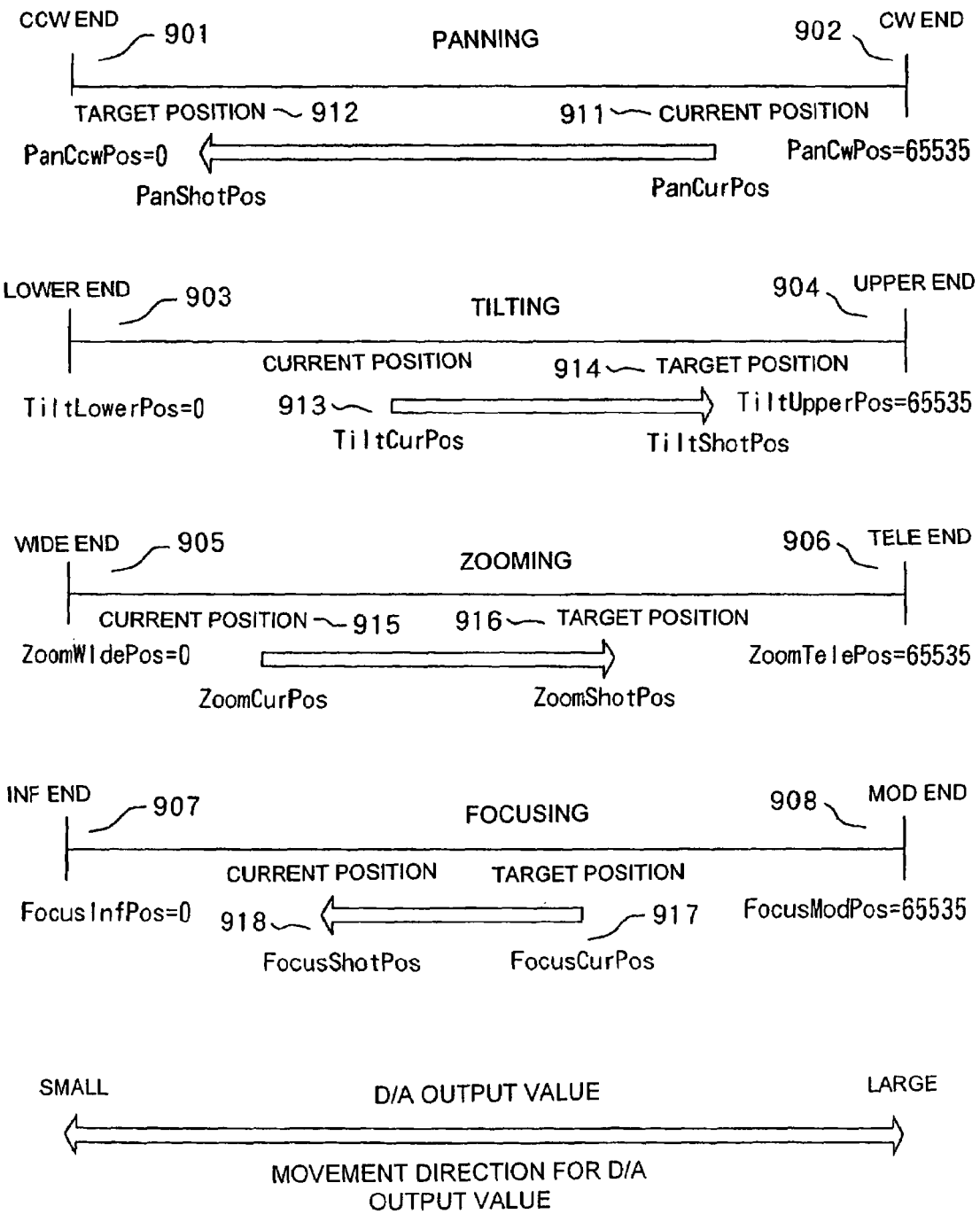
FIG. 7 is a conceptual diagram illustrating a shot operation with the head unit.

Referring to FIG. 7, the following is a description of a "shot operation." Here, shot operation refers to the control for moving the zoom lens 501, the focus lens 601, the panning mechanism 301 and the tilting mechanism 401 from their respective current positions to the set (stored) target positions (shot positions), in response to an operation start command.

In this case, "synchronized shot operation" refers to the case that at least two of the four shot operations of the zoom lens 501, the focus lens 601, the panning mechanism 301 and the tilting mechanism 401 are controlled such that they start substantially simultaneously and finish substantially simultaneously within a preset target operation time (shot drive time).

In this premised technology, the position data of the panning position at the counter-clockwise (CCW) end 901 is defined as PanCcwPos=0, and the position data of the panning position at the clockwise (CW) end 902 is defined as PanCwPos=65535.

The position data of the tilting position at the lower (LOWER) end 903 is defined as TiltLowerPos=0, and the position data of the tilting position at the upper(UPPER) end 904 is defined as TiltUpperPos=65535.

The position data of the zooming position at the wide-angle end 905 is defined as ZoomWidePos=0, and the position data of the zooming position at the telephoto end 906 is defined as ZoomTelePos=65535.

The position data of the focusing position at the infinity (INF) end 907 is defined as FocusInfPos=0, and the position data of the focusing position at the near (MOD) end 908 is defined as FocusModPos=65535.

PanCurPos 911 is the current panning position, and PanShotPos 912 is the target panning position.

TiltCurPos 913 is the current tilting position, and TiltShotPos 914 is the target tilting position.

ZoomCurPos 915 is the current zooming position, and ZoomShotPos 916 is the target zooming position.

FocusCurPos 917 is the current focusing position, and FocusShotPos 918 is the target focusing position.

Here, the panning control signal which is input from the head CPU 206 into the D/A converter c 304 (see FIG. 3) for panning position control is a 16-bit signal, and also the tilting control signal which is input into the D/A converter d 404 (see FIG. 4) for tilting position control is a 16-bit signal. Moreover, in FIG. 2, the zooming control signal which is input from the head CPU 206 into the D/A converter b 204 for zooming position control is a 16-bit signal, and also the focus control signal which is input into the D/A converter a 202 for focusing position control is a 16-bit signal.

Also the signal for detecting the panning position which is input from the A/D converter c 307 (see FIG. 3) into the head CPU 206 is a 16-bit signal, and also the signal for detecting the tilting position which is input from the A/D converter d 407 (see FIG. 4) into the head CPU 206 is a 16-bit signal.

Also in FIG. 2, the signal for detecting the zooming position which is input from the A/D converter b 205 into the head CPU 206 is a 16-bit signal, and also the signal for detecting the focusing position which is input from the A/D converter a 203 into the head CPU 206 is a 16-bit signal.

The feedback circuit used for the panning position control is configured such that if the value given from the head CPU 206 to the D/A converter c 304 is 0, then the panning position is moved to the CCW end, that is, to the position PanCcwPos=0, and if the value given to the D/A converter c 304 is 65535, then the panning position is moved to the CW end, that is, to the position PanCwPos=65535.

The feedback circuit used for the tilting position control is configured such that if the value given from the head CPU 206 to the D/A converter d 404 is 0, then the tilting position is moved to the lower end, that is, to the position TiltLowerPos=0, and if the value given to the D/A converter d 404 is 65535, then the tilting position is moved to the upper end, that is, to the position TiltUpperPos=65535.

The feedback circuit used for the zooming position control is configured such that if the value given from the head CPU 206 to the D/A converter b 204 is 0, then the zooming position is moved to the wide-angle end, that is, to the position ZoomWidePos=0, and if the value given to the D/A converter b 204 is 65535, then the zooming position is moved to the telephoto end, that is, to the position ZoomTelePos=65535.

The feedback circuit used for the focusing position control is configured such that if the value given from the head CPU 206 to the D/A converter a 202 is 0, then the focusing position is moved to the INF end, that is, to the position FocusInfPos=0, and if the value given to the D/A converter a 202 is 65535, then the focusing position is moved to the MOD end, that is, to the position FocusModPos=65535.

Figure 8:
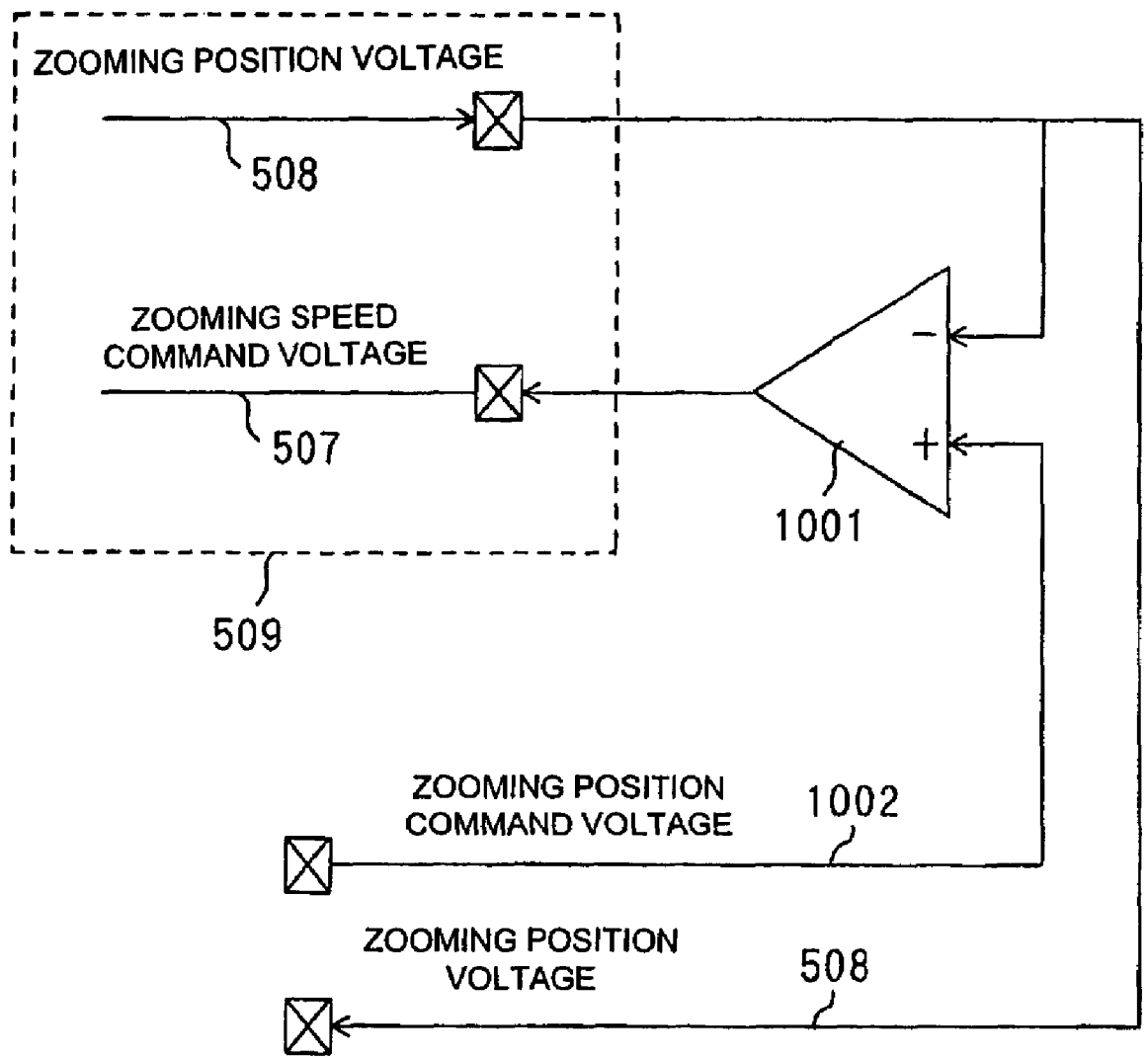
FIG. 8 shows the structure of an additional circuit for the shot operation.

Referring to FIG. 8, the following is a description of a circuit which is added in accordance with the present invention in order to perform a zoom shot operation.

As described above, in the present embodiment, the zoom lens control circuit is configured to perform speed control of the zoom lens 501, but in order to adapt it to shot operations, a circuit enabling position control of the zoom lens 501 is added to the control unit inside the main head 112 or the image-taking lens 200, and is connected to the external interface 509 of the zoom lens control circuit shown in FIG. 5.

That is to say, the zooming position command voltage 1002 applied from the control unit inside the main head 112 is input into the plus terminal of the differential amplifier b 1001, and the output of the differential amplifier b 1001 is input into the input terminal for the zooming speed command voltage 507 of the external interface 509 of the image-taking lens 200. Moreover, the zooming position voltage 508 output from the external interface 509 is input into the minus terminal of the differential amplifier b 1001, thus configuring a feedback circuit for position control of the zoom lens 501. It should be noted that the zooming position voltage 508 output from the external interface 509 can be used for confirming the zoom shot operation.

Figure 9:
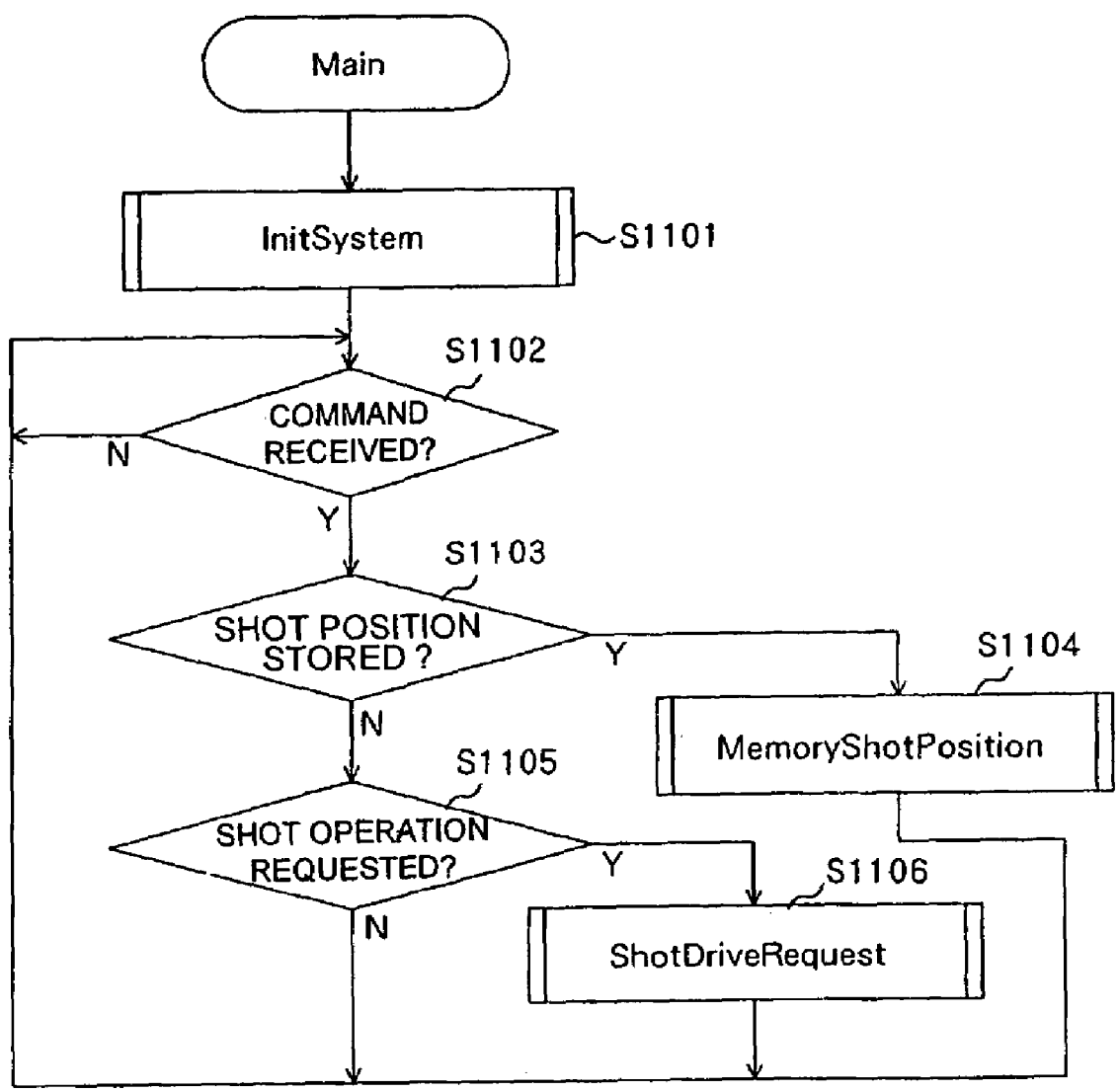
FIG. 9 is a main flowchart of the shot operation.

Referring to FIG. 9, the following is an explanation of a main flowchart illustrating the operation of the control unit according to the present embodiment.

Figure 10:
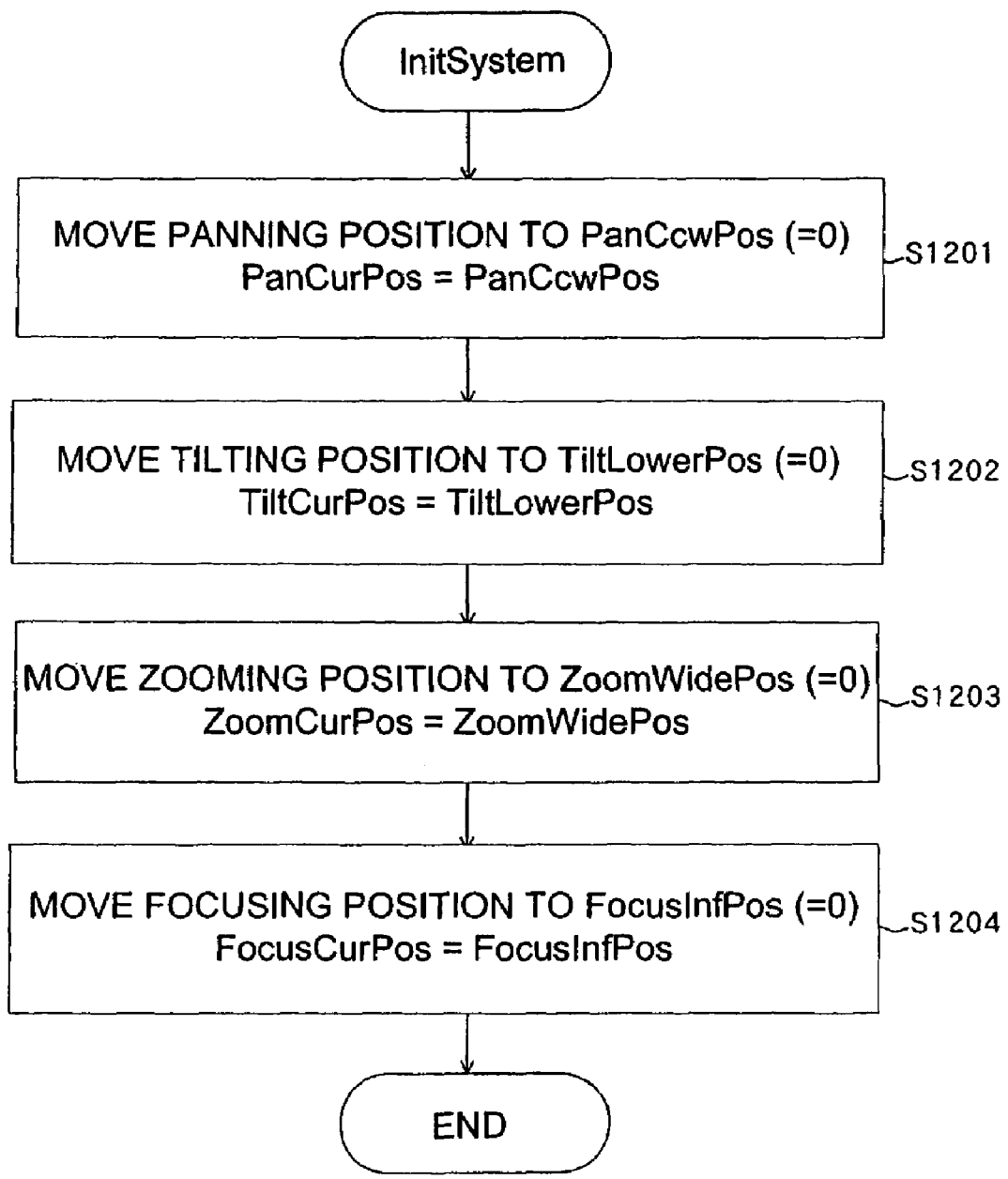
FIG. 10 is a flowchart of an initialization subroutine for the shot operation.

First, at Step 1001 (in the figures, steps are marked by the letter "S"), an initialization subroutine (InitSystem) as shown in FIG. 10 is called, and the control unit is initialized. Then the procedure advances to Step 1102.

At Step 1102, the procedure waits for a command from the operation box 101. When no command is received, then Step 1102 is repeated. When a command is received at Step 1102, then the procedure advances to Step 1103 in order to process the received command.

As for the processing of the received command here, there are the zooming and the focusing process, the panning and the tilting process, and the gain adjustment and white balance focus of the camera control, but in the following explanations, only the processing necessary for a shot operation is explained.

At Step 1103, it is checked whether the command received at Step 1102 is a command for storing the shot position. If it is judged that it is a command for storing the shot position, then the procedure advances to Step 1104.

Figure 19:
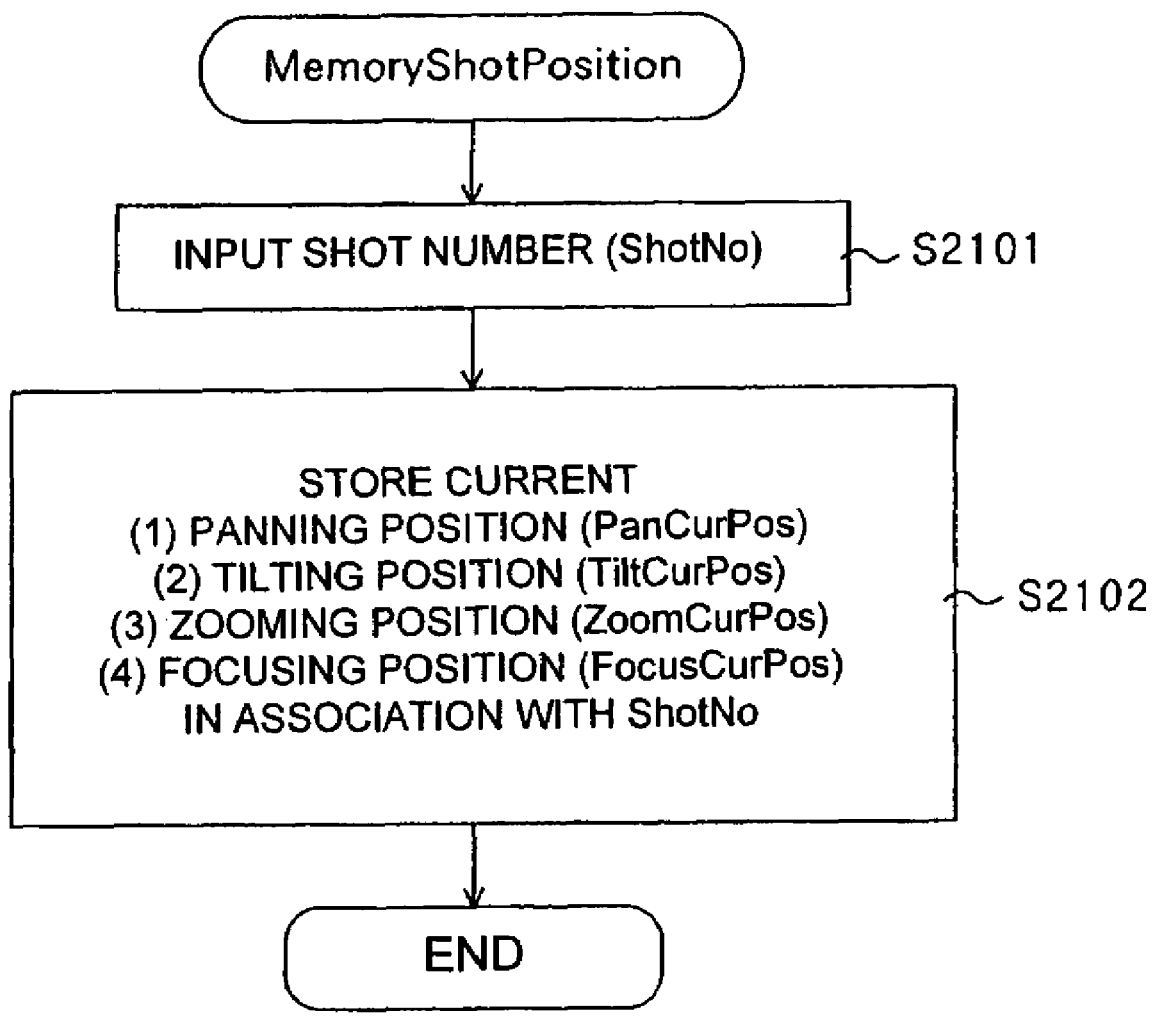
FIG. 19 is a flowchart of a shot position storage subroutine for the shot operation.

At Step 1104, the shot position storage subroutine (MemoryShotPosition) shown in FIG. 19 is called, and the shot position is stored. If it is judged at Step 1003 that the received command is not a command for storing the shot position, then the procedure advances to Step 1105.

At Step 1105, it is judged whether the received command is a command for a shot operation request (command ordering the start of a shot operation). If it is judged that the received command is a command for a shot operation request, then the procedure advances to Step 1106.

Figure 11:
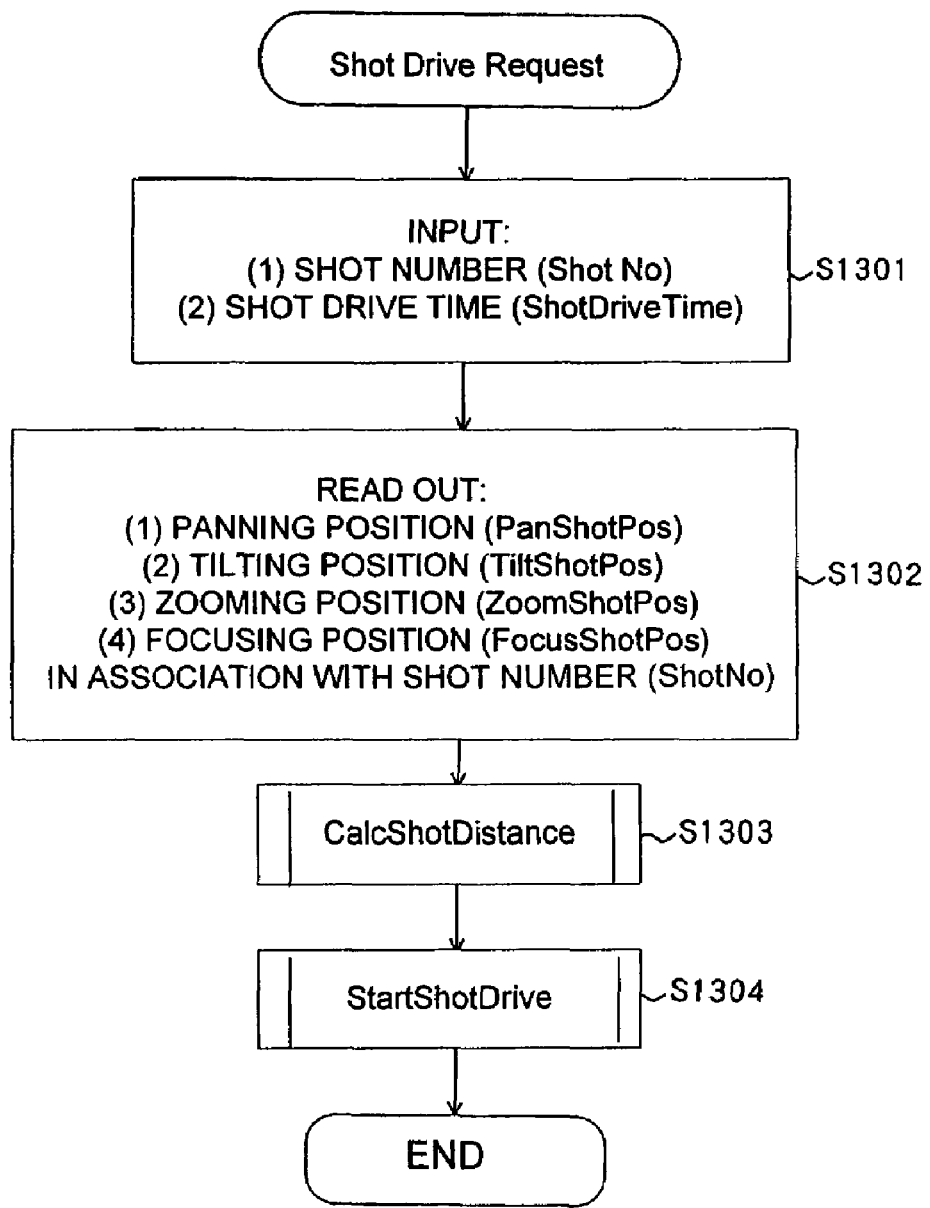
FIG. 11 is a flowchart of a shot operation request subroutine for the shot operation.

At Step 1106, the shot operation request subroutine (ShotDriveRequest) shown in FIG. 11 is called, and a shot operation is carried out. If it is judged at Step 1105 that the received command is not a command for a shot operation request, then the procedure advances to Step 1102.

Referring to FIG. 10, the following is a description of the initialization subroutine (InitSystem).

First, at Step 1201, the panning position is moved to PanCcwPos=0 (initial position). Then, the current panning position is set to PanCurPos=PanCcwPos. After that, the subroutine advances to Step 1202.

At Step 1202, the tilting position is moved to TiltLowerPos=0 (initial position). Then, the current tilting position is set to TiltCurPos=TiltLowerPos. After that, the subroutine advances to Step 1203.

At Step 1203, the zooming position is moved to ZoomWidePos=0. Then, the current zooming position is set to ZoomCurPos=ZoomWidePos. After that, the subroutine advances to Step 1204.

At Step 1204, the focusing position is moved to FocusInfPos=0. Then, the current focusing position is set to FocusCurPos=FocusInfPos. After that, the subroutine ends.

Referring to FIG. 11, the following is a description of the shot operation request subroutine (ShotDriveRequest).

First, at Step 1301, the shot number (ShotNo) and the shot drive time (ShotDriveTime: target operation time) sent from the operation box 101 are read in. Here, the shot number (ShotNo) is a number which is assigned to each of the sets of shot positions for panning, tilting, zooming and focusing, which has been stored in advance in the memory 210. Then, the subroutine advances to Step 1302.

At Step 1302, the panning position (PanShotPos), the tilting position (TiltShotPos), the zooming position (ZoomShotPos) and the focusing position (FocusShotPos) are read out from the memory 210 in accordance with the shot number (ShotNo) which was read in. Then, the subroutine advances to Step 1303.

Figure 12:
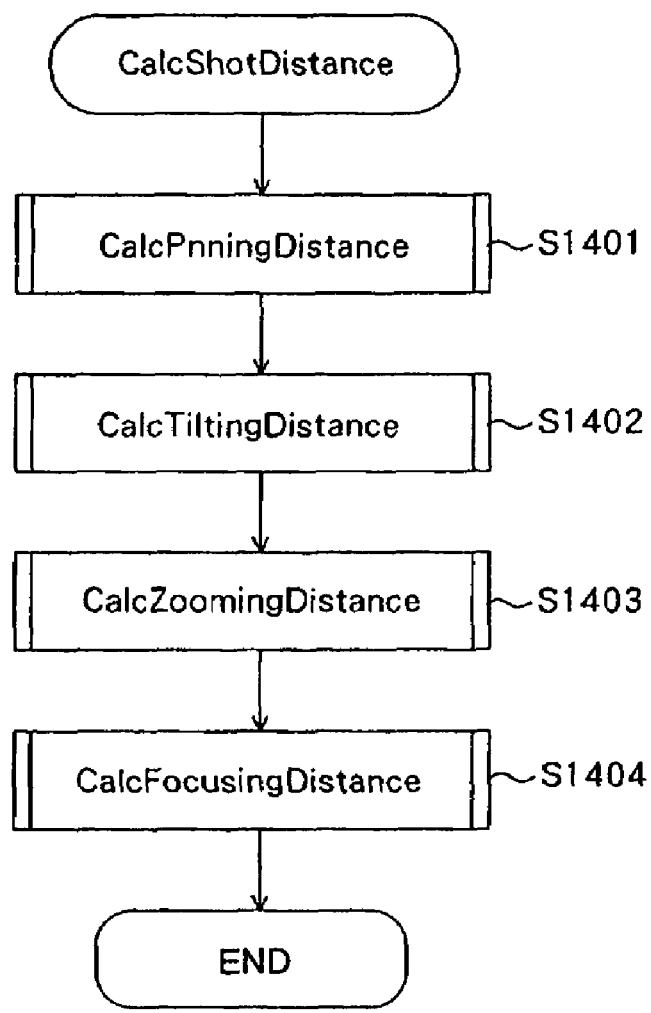
FIG. 12 is a flowchart of a shot distance calculation subroutine for the shot operation.

At Step 1303, the shot distance calculation subroutine (CalcShotDistance) shown in FIG. 12 is called in order to calculate the drive distance (drive amount) for the shot operation. Then, the subroutine advances to Step 1304.

Figure 13:
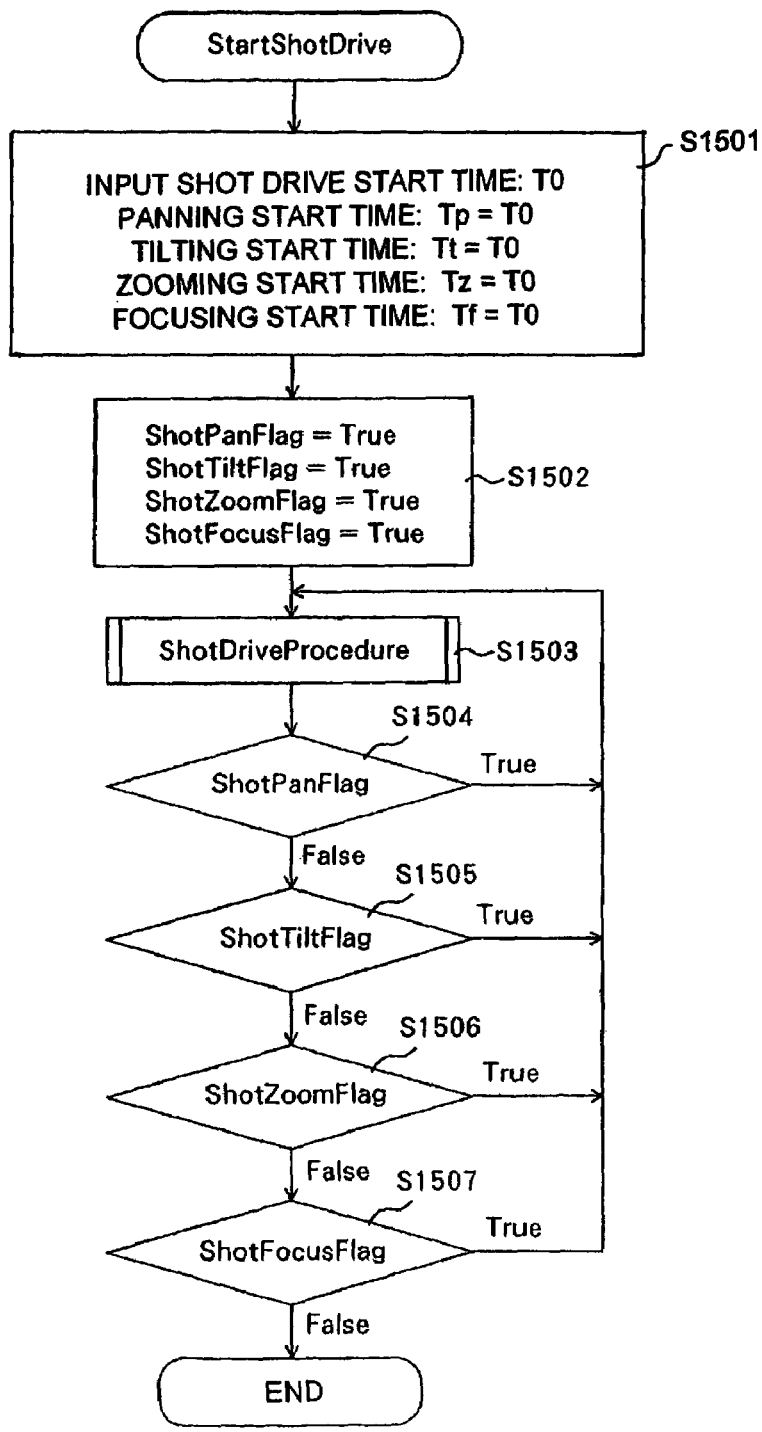
FIG. 13 is a flowchart of a shot operation start subroutine for the shot operation.

At Step 1304, the shot operation start subroutine (StartShotDrive) shown in FIG. 13 is called in order to start the shot operation. Then, the subroutine ends.

Referring to FIG. 12, the following is a description of the shot distance calculation subroutine (CalcShotDistance).

Figure 20:
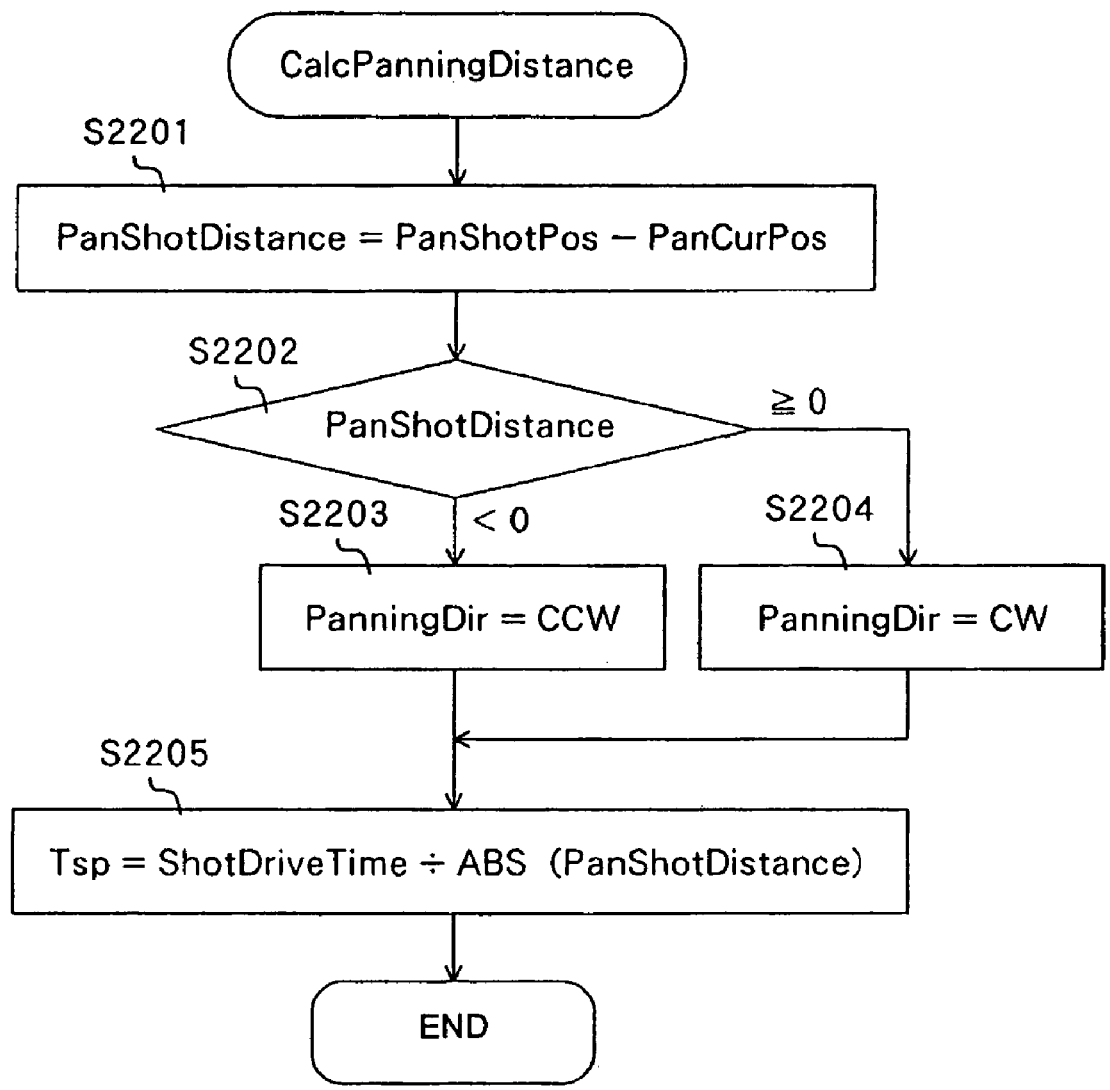
FIG. 20 is a flowchart of a panning distance calculation subroutine for the shot operation.

First, at Step 1401, the panning distance calculation subroutine (CalcPanningDistance) shown in FIG. 20 is called in order to calculate the driving distance for the panning shot operation. Then, the subroutine advances to Step 1402.

Figure 21:
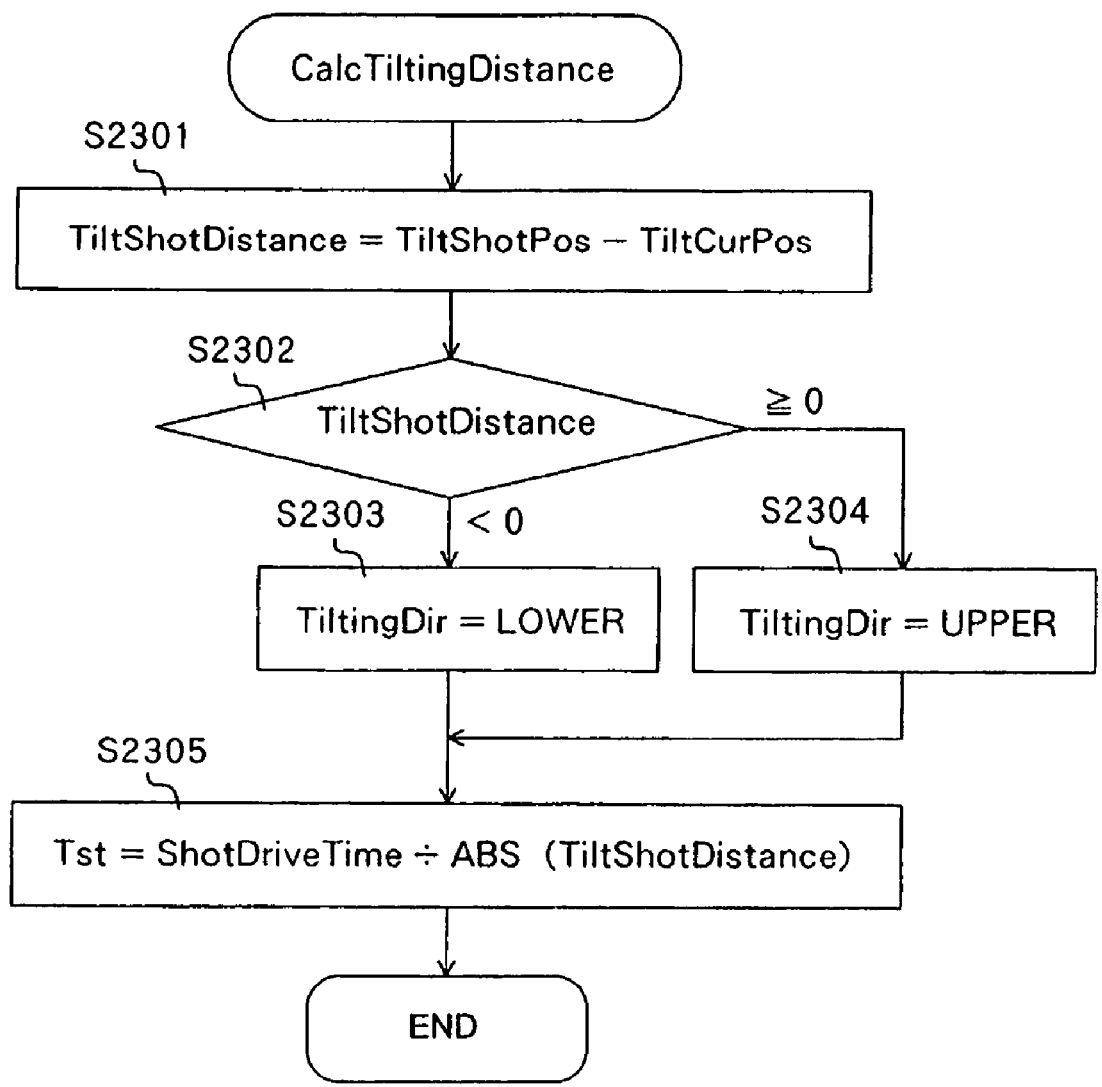
FIG. 21 is a flowchart of a tilting distance calculation subroutine for the shot operation.

At Step 1402, the tilting distance calculation subroutine (CalcTiltingDistance) shown in FIG. 21 is called in order to calculate the driving distance for the tilting shot operation. Then, the subroutine advances to Step 1403.

Figure 22:
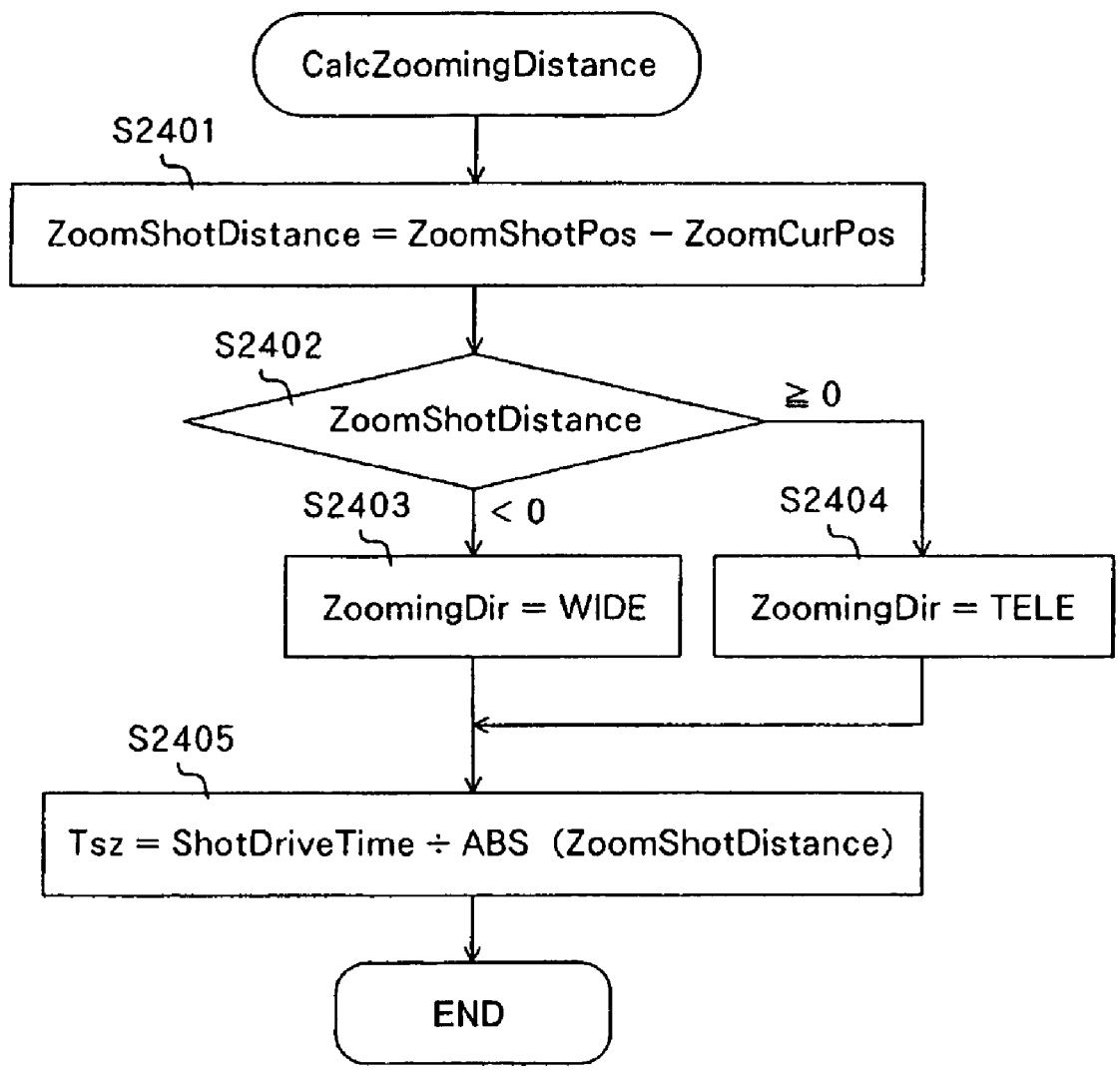
FIG. 22 is a flowchart of a zooming distance calculation subroutine for the shot operation.

At Step 1403, the zooming distance calculation subroutine (CalcZoomingDistance) shown in FIG. 22 is called in order to calculate the driving distance for the zooming shot operation. Then, the subroutine advances to Step 1404.

Figure 23:
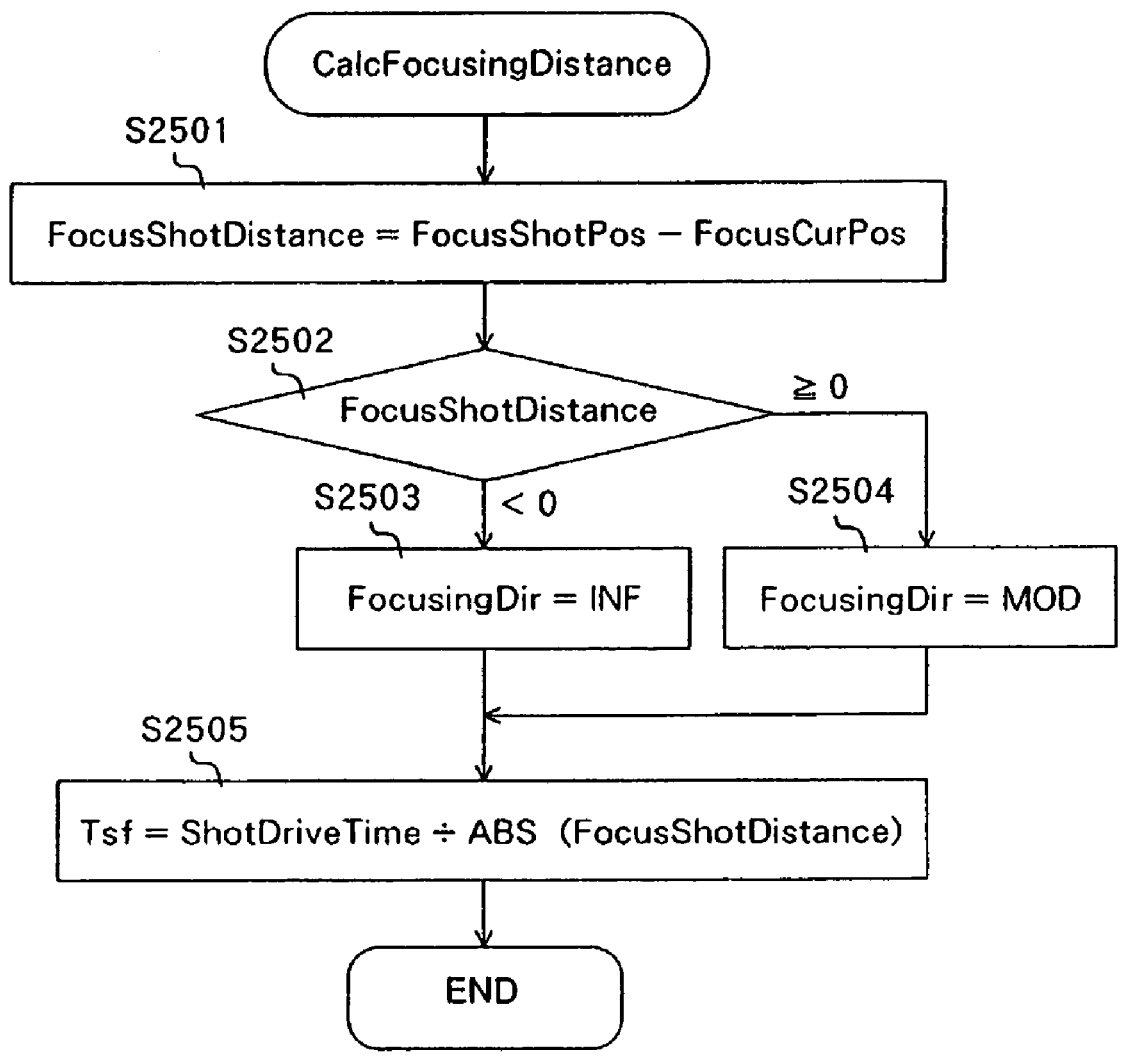
FIG. 23 is a flowchart of a focusing distance calculation subroutine for the shot operation.

At Step 1404, the focusing distance calculation subroutine (CalcFocusingDistance) shown in FIG. 23 is called in order to calculate the driving distance for the focusing shot operation. Then, the subroutines ends.

Referring to FIG. 13, the following is a description of the shot operation start subroutine (StartShotDrive).

First, at Step 1501, a shot operation start time T0 (the time at which the shot operation has been ordered) is read in from the timer 209. Then, the following settings are made:

| | |
|---|---|
| panning start time: | Tp = T0 |
| tilting start time: | Tt = T0 |
| zooming start time: | Tz = T0 |
| focusing start time: | Tf = T0 |

Then, the subroutine advances to Step 1502.

At Step 1502, flags indicating whether the shot operations of panning, tilting, zooming and focusing are currently being executed or have finished are set to indicate current execution. That is to say, the following settings are made:

ShotPanFlag=True
ShotTiltFlag=True
ShotZoomFlag=True
ShotFocusFlag=True

Then, the subroutine advances to Step 1503.

Figure 14:
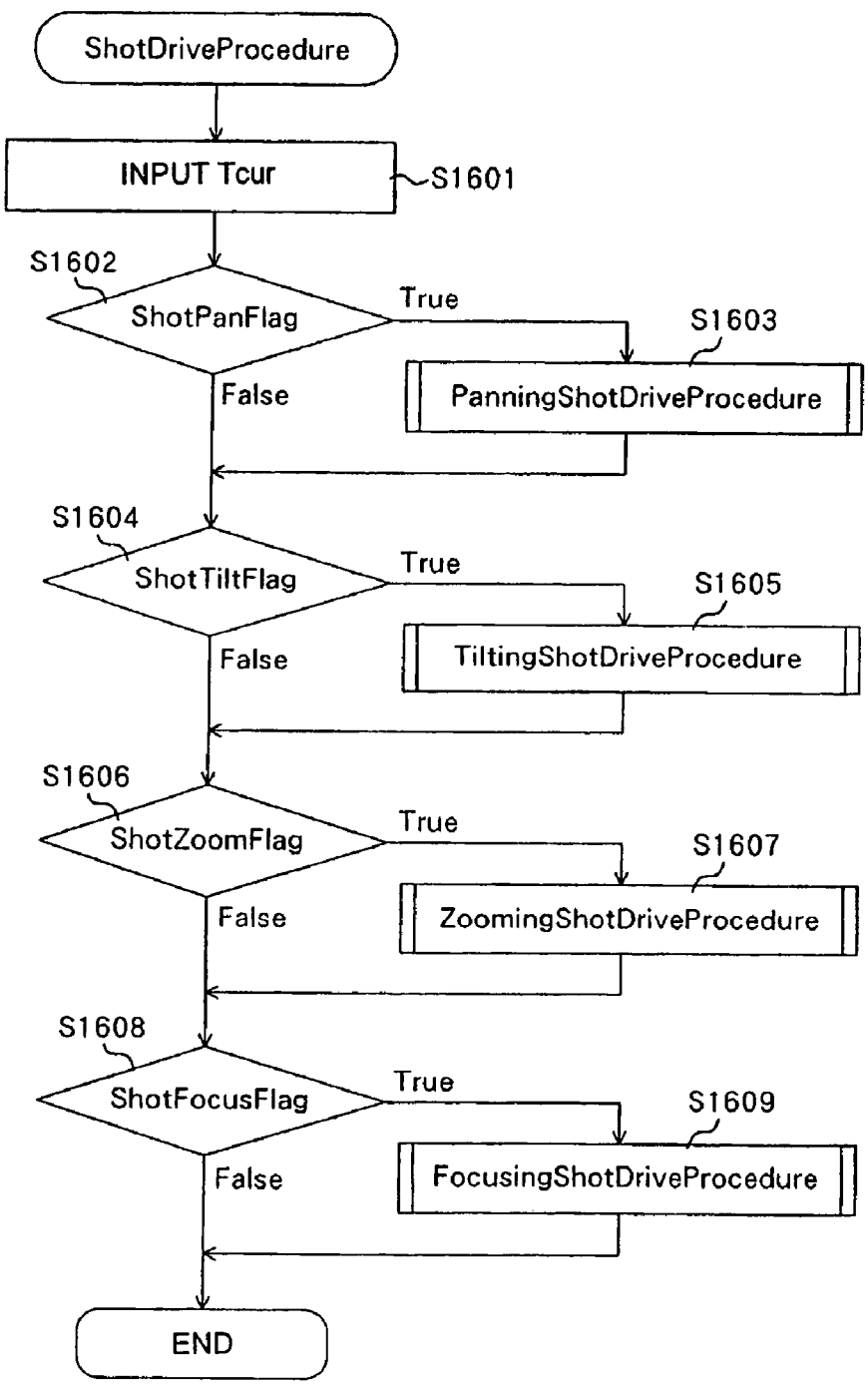
FIG. 14 is a flowchart of a shot operation processing subroutine for the shot operation.

At Step 1503, the shot operation processing subroutine (ShotDriveProcedure) for executing the shot operation shown in FIG. 14 is called. Then, the subroutine advances to Step 1504.

At Step 1504, it is checked whether the panning shot operation is currently being executed or whether it has finished. If ShotPanFlag is true, then the panning shot operation is currently being executed, so that the subroutine returns to Step 1503. If ShotPanFlag is false, then the panning shot operation has finished, so that the subroutine advances to Step 1505.

At Step 1505, it is checked whether the tilting shot operation is currently being executed or whether it has finished. If ShotTiltFlag is true, then the tilting shot operation is currently being executed, so that the subroutine returns to Step 1503. If ShotTiltFlag is false, then the tilting shot operation has finished, so that the subroutine advances to Step 1506.

At Step 1506, it is checked whether the zooming shot operation is currently being executed or whether it has finished. If ShotZoomFlag is true, then the zooming shot operation is currently being executed, so that the subroutine returns to Step 1503. If ShotZoomFlag is false, then the zooming shot operation has finished, so that the subroutine advances to Step 1507.

At Step 1507, it is checked whether the focusing shot operation is currently being executed or whether it has finished. If ShotFocusFlag is true, then the focusing shot operation is currently being executed, so that the subroutine returns to Step 1503. If ShotFocusFlag is false, then the focusing shot operation has finished, so that the subroutine ends.

Referring to FIG. 14, the following is a description of the shot operation processing subroutine (ShotDriveProcedure) for executing the shot operation.

First, at Step 1601, the current time Tcur is read in from the timer 209. Then, the subroutine advances to Step 1602.

Figure 15:
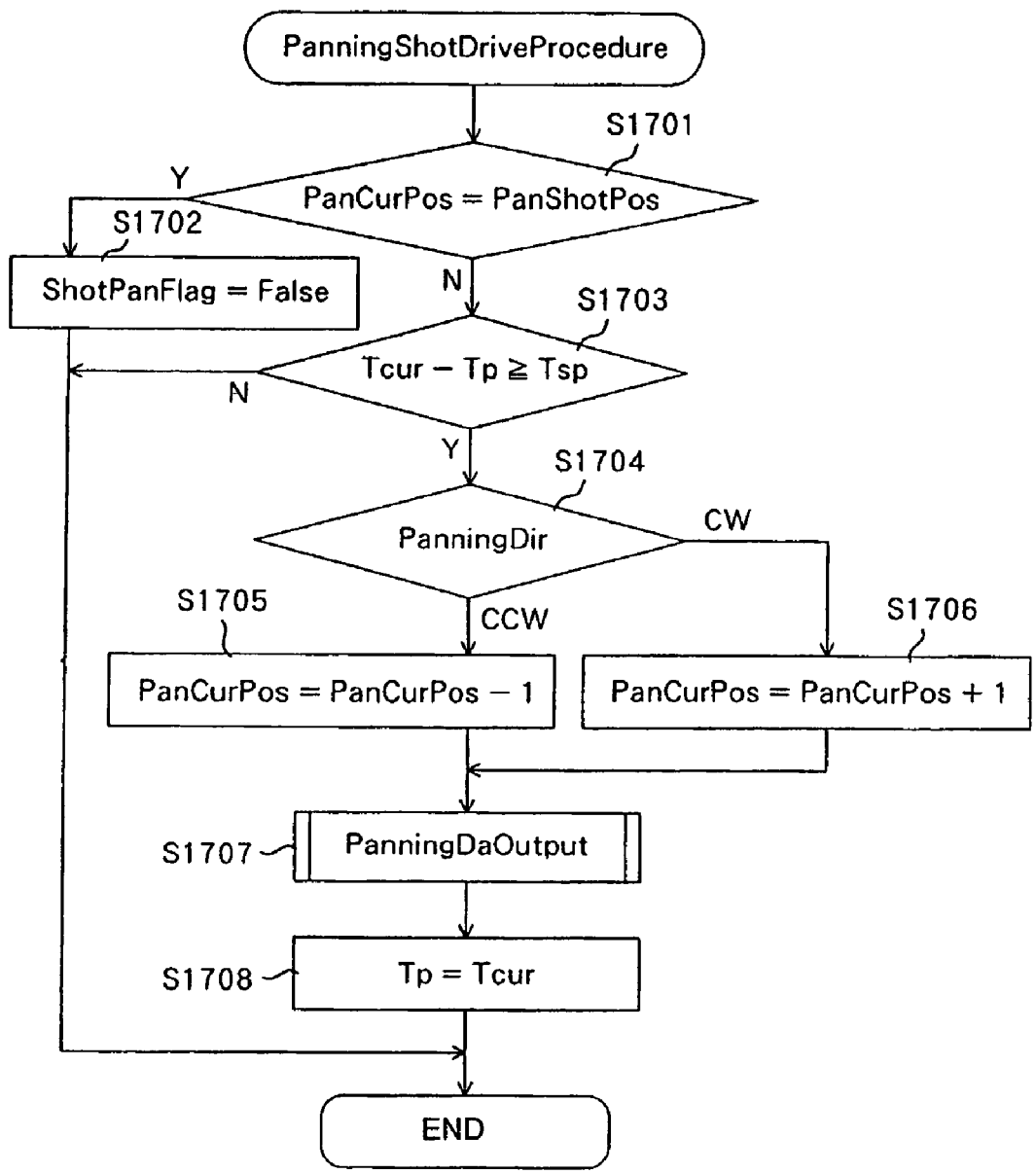
FIG. 15 is a flowchart of a panning shot operation subroutine for the shot operation.

At Step 1602, ShotPanFlag is checked. If ShotPanFlag is true, then the subroutine advances to Step 1603 to perform the processing for the panning shot operation, and the panning shot operation subroutine (PanningShotDriveProcedure) shown in FIG. 15 is called. Then, the subroutine advances to Step 1604. If, at Step 1602, ShotPanFlag is false, then the panning shot operation has finished, so that the subroutine advances to Step 1604.

Figure 16:
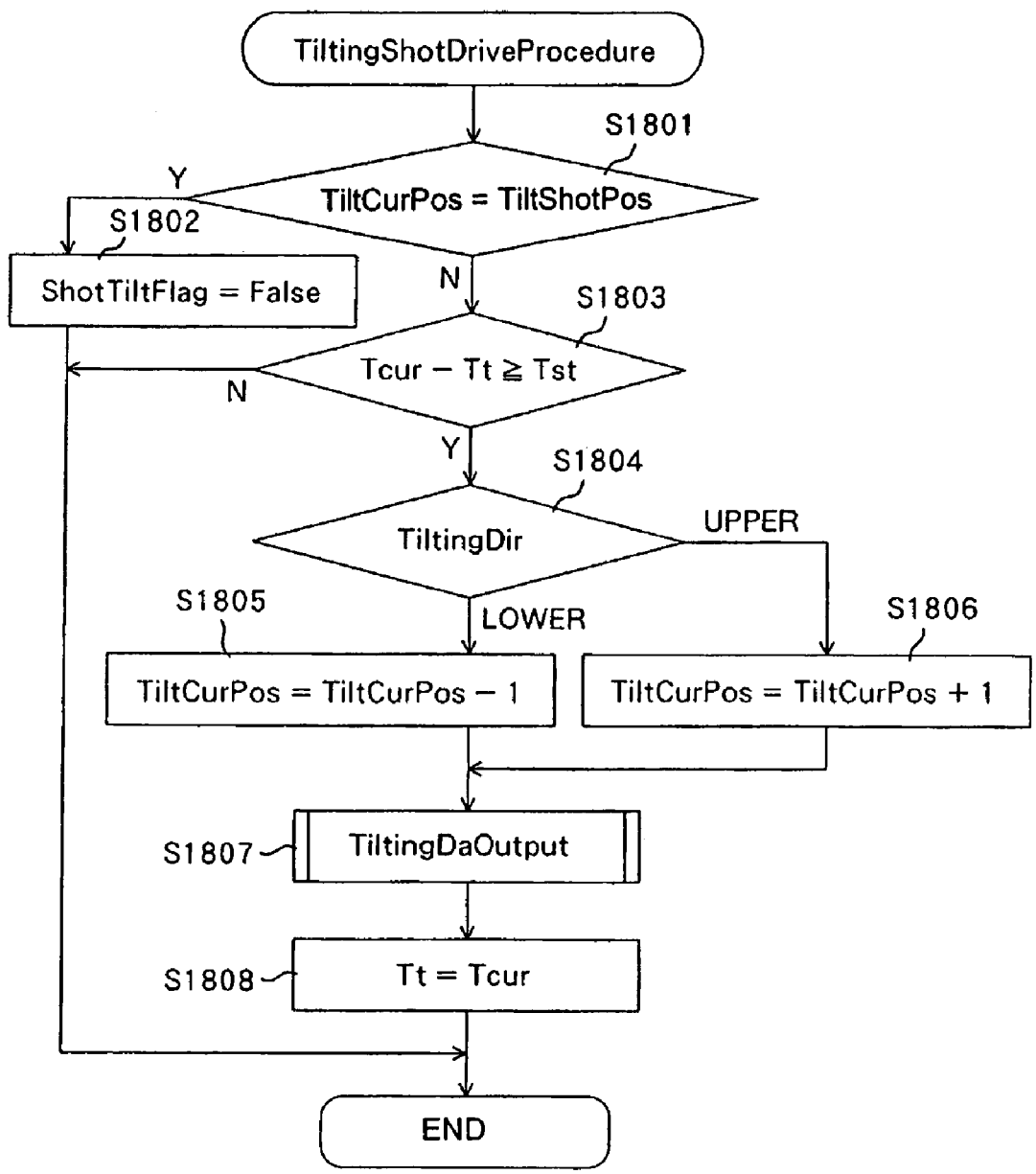
FIG. 16 is a flowchart of a tilting shot operation subroutine for the shot operation.

At Step 1604, ShotTiltFlag is checked. If ShotTiltFlag is true, then the subroutine advances to Step 1605 to perform the processing for the tilting shot operation, and the tilting shot operation subroutine (TiltingShotDriveProcedure) shown in FIG. 16 is called. Then, the subroutine advances to Step 1606. If, at Step 1604, ShotTiltFlag is false, then the tilting shot operation has finished, so that the subroutine advances to Step 1606.

Figure 17:
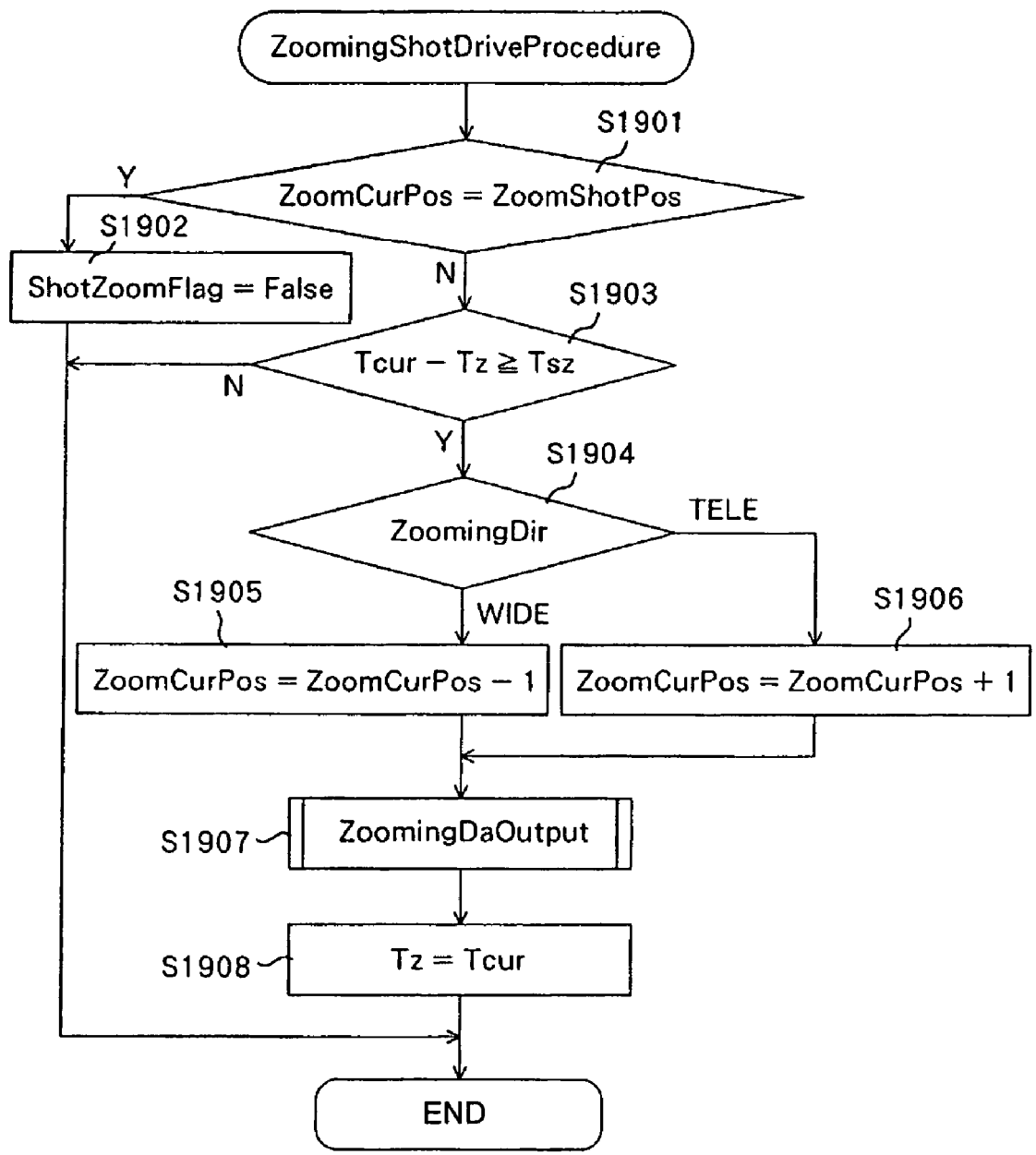
FIG. 17 is a flowchart of a zooming shot operation subroutine for the shot operation.

At Step 1606, ShotZoomFlag is checked. If ShotZoomFlag is true, then the subroutine advances to Step 1607 to perform the processing for the zooming shot operation, and the zooming shot operation subroutine (ZoomingShotDriveProcedure) shown in FIG. 17 is called. Then, the subroutine advances to Step 1608. If, at Step 1606, ShotZoomFlag is false, then the zooming shot operation has finished, so that the subroutine advances to Step 1608.

Figure 18:
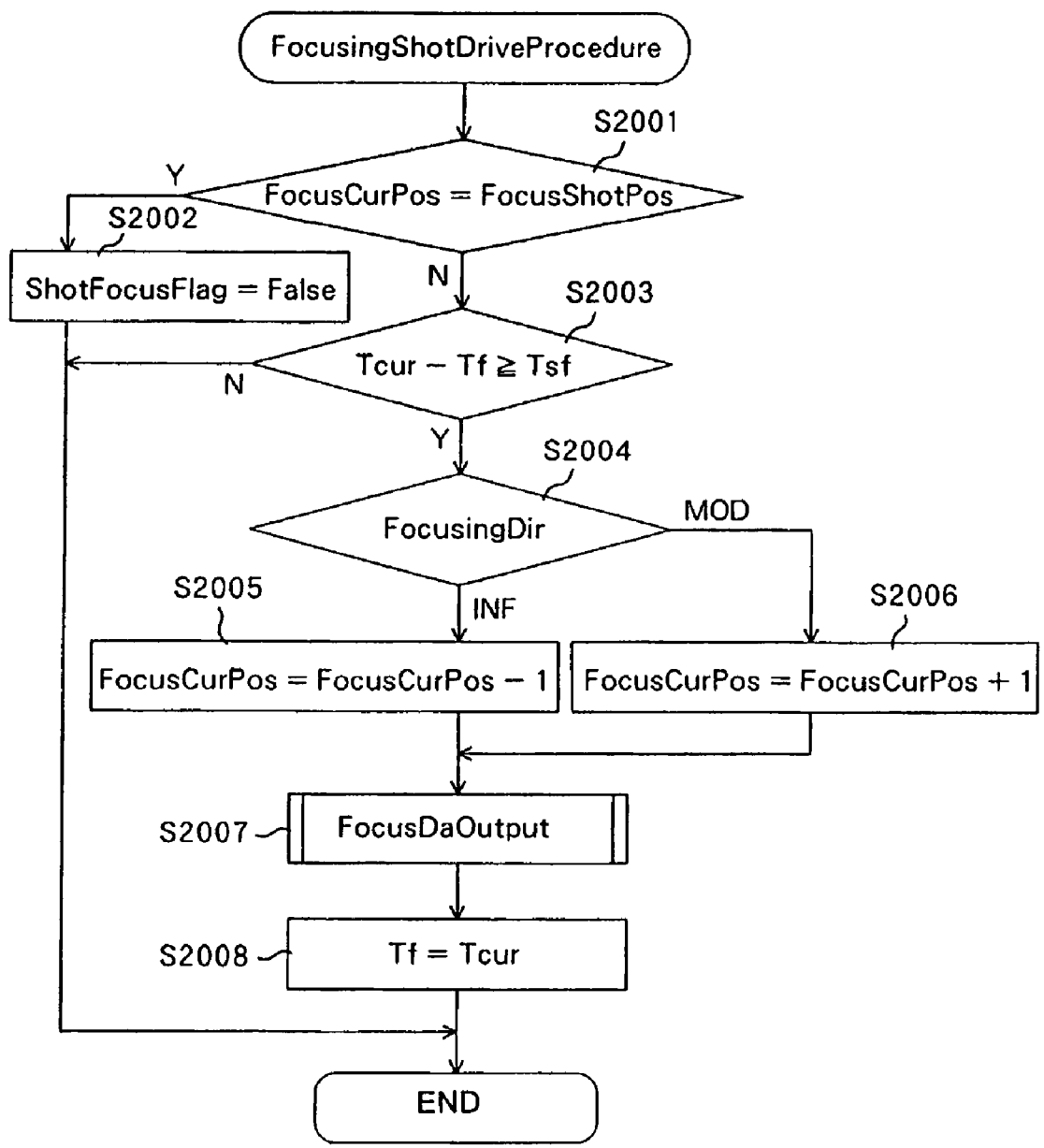
FIG. 18 is a flowchart of a focusing shot operation subroutine for the shot operation.

At Step 1608, ShotFocusFlag is checked. If ShotFocusFlag is true, then the subroutine advances to Step 1609 to perform the processing for the focusing shot operation, and the focusing shot operation subroutine (FocusingShotDriveProcedure) shown in FIG. 18 is called. Then, the subroutine ends. If, at Step 1608, ShotFocusFlag is false, then the focusing shot operation has finished, so that the subroutine ends.

Referring to FIG. 15, the following is an explanation of the panning shot operation subroutine (PanningShotDriveProcedure).

First, at Step 1701, the current panning position is compared with the shot position. If PanCurPos=PanShotPos is given, then the panning shot operation has finished, so that the subroutine advances to Step 1702 and ShotPanFlag is set to ShotPanFlag=False. Then, the subroutine ends. If, at Step 1701, PanCurPos=PanShotPos is not given, then the panning shot operation has not yet finished, so that the subroutine advances to Step 1703.

At Step 1703, it is checked, using Expression (1), whether the output timing Tsp of the panning control signal from the head CPU 206 to the D/A converter c 304 (see FIG. 3) has passed (that is, whether the time has come at which the panning control signal should be output).

$$Tcur-Tp \geq Tsp \quad (1)$$

If Expression (1) is given, the timing for output to the D/A converter c 304 has come, so that the subroutine advances to Step 1704. If, at Step 1703, Expression (1) is not given, then the timing for output to the D/A converter c 304 has not yet come, so that the subroutine ends.

At Step 1704, the panning drive direction is checked. If PanningDir=CW, then the subroutine advances to Step 1706. If PanningDir=CCW, then the subroutine advances to Step 1705.

At Step 1705, the panning position is updated using Expression (2), in order to perform panning in the CCW direction.

$$PanCurPos=PanCurPos-1 \quad (2)$$

Then, the subroutine advances to Step 1707.

At Step 1706, the panning position is updated using Expression (3), in order to perform panning in the CW direction.

$$PanCurPos=PanCurPos+1 \quad (3)$$

Then, the subroutine advances to Step 1707.

Figure 24:
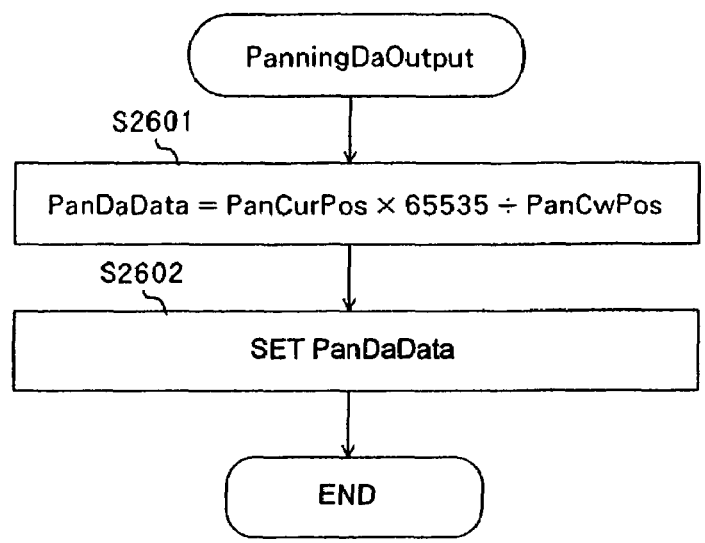
FIG. 24 is a flowchart of a panning D/A subroutine for the shot operation.

At Step 1707, the panning D/A output subroutine (PanningDaOutput) shown in FIG. 24 is called in order to output the panning control signal to the D/A converter c 304. Then, the subroutine advances to Step 1708.

At Step 1708, Tp is set to Tp=Tcur in order to store the output timing at which the panning control signal has been output to the D/A converter c 304. Then, the subroutine ends.

Referring to FIG. 16, the following is an explanation of the tilting shot operation subroutine (TiltingShotDriveProcedure).

First, at Step 1801, the current tilting position is compared with the shot position. If TiltCurPos=TiltShotPos is given, then the tilting shot operation has finished, so that the subroutine advances to Step 1802 and ShotTiltFlag is set to ShotTiltFlag=False. Then, the subroutine ends. If, at Step 1801, TiltCurPos=TiltShotPos is not given, then the tilting shot operation has not yet finished, so that the subroutine advances to Step 1803.

At Step 1803, it is checked, using Expression (4), whether the output timing Tst of the tilting control signal to the D/A converter d 404 (see FIG. 4) has passed (that is, whether the time has come at which the tilting control signal should be output).

$$Tcur-Tt \geq Tst \quad (4)$$

If Expression (4) is given, the timing for output of the tilting control signal to t he D/A converter d 404 has come, so that the subroutine advances to Step 1804. If, at Step 1803, Expression (4) is not given, then the timing for output to the D/A converter d 404 has not yet come, so that the subroutine ends.

At Step 1804, the tilting drive direction is checked. If TiltingDir=UPPER, then the subroutine advances to Step 1806. If TiltingDir=LOWER, then the subroutine advances to Step 1805.

At Step 1805, the tilting position is updated using Expression (5), in order to perform tilting in the LOWER direction.

$$TiltCurPos=TiltCurPos-1 \quad (5)$$

Then, the subroutine advances to Step 1807.

At Step 1806, the tilting position is updated using Expression (6), in order to perform tilting in the UPPER direction.

$$TiltCurPos=TiltCurPos+1 \quad (6)$$

Then, the subroutine advances to Step 1807.

Figure 25:
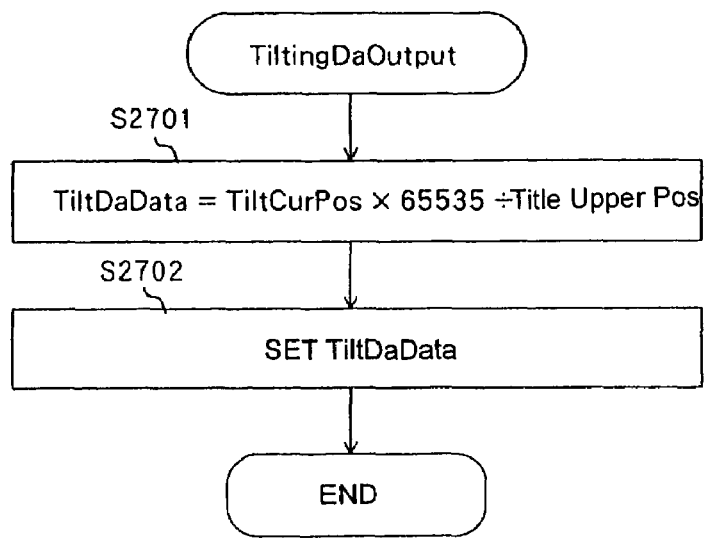
FIG. 25 is a flowchart of a tilting D/A subroutine for the shot operation.

At Step 1807, the tilting D/A output subroutine (TiltingDaOutput) shown in FIG. 25 is called in order to output the tilting control signal to the D/A converter d 404. Then, the subroutine advances to Step 1808.

At Step 1808, Tt is set to Tt=Tcur in order to store the output timing at which the tilting control signal has been output to the D/A converter d 404. Then, the subroutine ends.

Referring to FIG. 17, the following is an explanation of the zooming shot operation subroutine (ZoomingShotDriveProcedure).

At Step 1901, the current zooming position is compared with the shot position. If ZoomCurPos=ZoomShotPos is given, then the zooming shot operation has finished, so that the subroutine advances to Step 1902 and ShotZoomFlag is set to ShotZoomFlag=False. Then, the subroutine ends. If, at Step 1901, ZoomCurPos=ZoomShotPos is not given, then the zooming shot operation has not yet finished, so that the subroutine advances to Step 1903.

At Step 1903, it is checked, using Expression (7), whether the output timing Tsz of the zooming control signal to the D/A converter b 204 (see FIG. 2) has passed (that is, whether the time has come at which the zooming control signal should be output).

$$Tcur - Tz \geq Tsz \qquad (7)$$

If Expression (7) is given, then the timing for output to the D/A converter b 204 has come, so that the subroutine advances to Step 1904. If, at Step 1903, Expression (7) is not given, then the timing for output to the D/A converter b 204 has not yet come, so that the subroutine ends.

At Step 1904, the zooming drive direction is checked. If ZoomingDir=TELE, then the subroutine advances to Step 1906. If ZoomingDir=WIDE, then the subroutine advances to Step 1905.

At Step 1905, the zooming position is updated using Expression (8), in order to perform zooming in the WIDE direction.

$$ZoomCurPos = ZoomCurPos - 1 \qquad (8)$$

Then, the subroutine advances to Step 1907.

At Step 1906, the zooming position is updated using Expression (9), in order to perform zooming in the TELE direction.

$$ZoomCurPos = ZoomCurPos + 1 \qquad (8)$$

Then, the subroutine advances to Step 1907.

Figure 26:
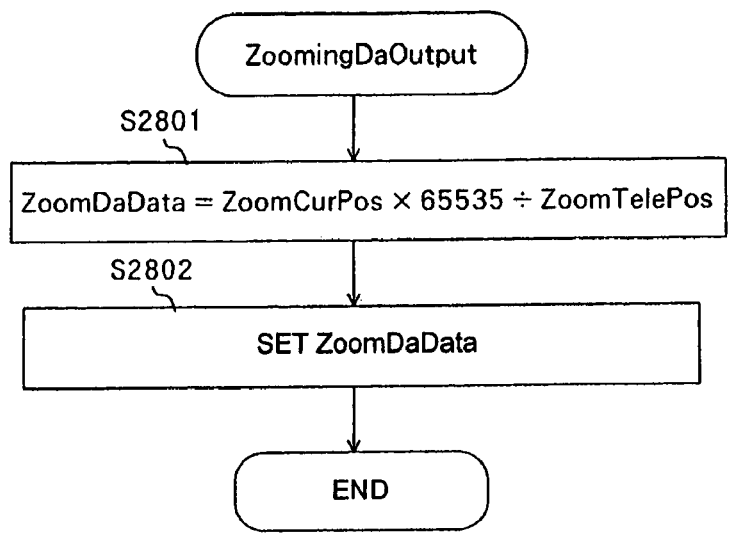
FIG. 26 is a flowchart of a zooming D/A subroutine for the shot operation.

At Step 1907, the zooming D/A output subroutine (ZoomingDaOutput) shown in FIG. 26 is called in order to output the zooming control signal to the D/A converter b 204. Then, the subroutine advances to Step 1908.

At Step 1908, Tz is set to Tz=Tcur in order to store the output timing at which the zooming control signal has been output to the D/A converter b 204. Then, the subroutine ends.

Referring to FIG. 18, the following is an explanation of the focusing shot operation subroutine (FocusingShotDriveProcedure).

First, at Step 2001, the current focusing position is compared with the shot position. If FocusCurPos=FocusShotPos is given, then the focusing shot operation has finished, so that the subroutine advances to Step 2002 and ShotFocusFlag is set to ShotFocusFlag=False. Then, the subroutine ends. If, at Step 2001, FocusCurPos=FocusShotPos is not given, then the focusing shot operation has not yet finished, so that the subroutine advances to Step 2003.

At Step 2003, it is checked, using Expression (10), whether the output timing Tsf of the focus control signal to the D/A converter a 202 has passed (that is, whether the time has come at which the focus control signal should be output).

$$Tcur - Tf \geq Tsf \qquad (10)$$

If Expression (10) is given, then the timing for output to the D/A converter a 202 has come, so that the subroutine advances to Step 2004. If, at Step 2003, Expression (10) is not given, then the timing for output to the D/A converter a 202 has not yet come, so that the subroutine ends.

At Step 2004, the focusing drive direction is checked. If FocusingDir=MOD, then the subroutine advances to Step 2006. If FocusingDir=INF, then the subroutine advances to Step 2005.

At Step 2005, the focusing position is updated using Expression (11), in order to perform focus driving in the INF direction.

$$FocusCurPos = FocusCurPos - 1 \qquad (11)$$

Then, the subroutine advances to Step 2007.

At Step 2006, the focusing position is updated using Expression (12), in order to perform focus driving in the MOD direction.

$$FocusCurPos = FocusCurPos + 1 \qquad (12)$$

Then, the subroutine advances to Step 2007.

Figure 27:
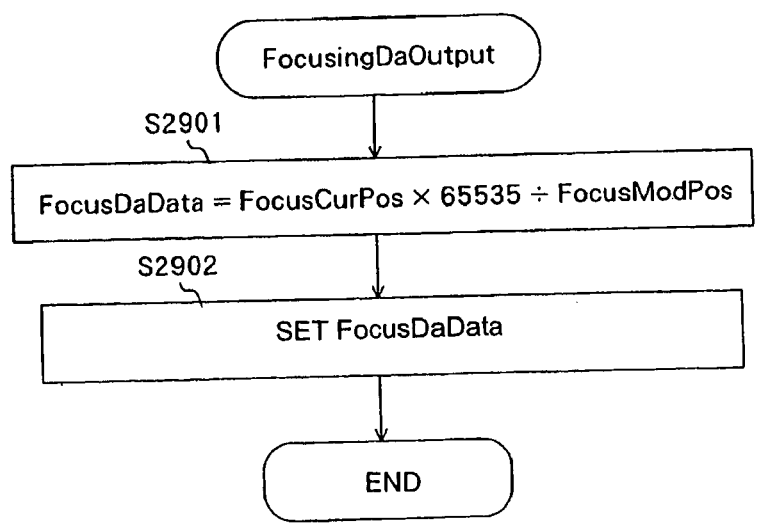
FIG. 27 is a flowchart of a focusing D/A subroutine for the shot operation.

At Step 2007, the focusing D/A output subroutine (FocusingDaOutput) shown in FIG. 27 is called in order to perform output to the D/A converter a 202. Then, the subroutine advances to Step 2008.

At Step 2008, Tf is set to Tf=Tcur in order to store the output timing of the focus control signal to the D/A converter a 202. Then, the subroutine ends.

Referring to FIG. 19, the following is a description of the shot position storage subroutine (MemoryShotPosition). This procedure is performed when the operator has set the panning, tilting, zooming and focusing positions in advance to desired positions, before performing the shot operation of the pan-tilt zoom image-taking system.

At Step 2101, the shot number (ShotNo) sent from the operation box 101 is read in. Then, the subroutine advances to Step 2102.

At Step 2102, the current panning position (PanCurPos), tilting position (TiltCurPos), zooming position (ZoomCurPos), and focusing position (FocusCurPos)

are stored in the memory 210, in association with the shot number (ShotNo). Then, the subroutine ends.

By repeating this operation while changing at least one of the panning, tilting, zooming and focusing positions, it is possible to store a plurality of shot position sets in association with different shot numbers in the memory 210.

In the actual program, this can be realized by providing an array for the respective shot positions of the panning position, the tilting position, the zooming position and the focusing position, and storing the data by taking the shot numbers as the arguments of the array.

Below is an example of the case that arrays of 10 items are provided in the C programming language:
   unsigned int PanCurPosDim[10]
   unsigned int TiltCurPosDim[10]
   unsigned int ZoomCurPosDim[10]
   unsigned int FocusCurPosDim[10]
In this case, the shot positions can be stored as follows:
   PanCurPosDim[ShotNo]=PanCurPos
   TiltCurPosDim[ShotNo]=TiltCurPos
   ZoomCurPosDim[ShotNo]=ZoomCurPos
   FocusCurPosDim[ShotNo]=FocusCurPos Referring to FIG. 20, the following is a description of the panning distance calculation subroutine (CalcPanningDistance).

First, at Step 2201, the distance PanShotDistance between the current panning position PanCurPos and the panning shot position PanShotPos is calculated using Expression (13):

$$PanShotDistance=PanShotPos-PanCurPos \quad (13)$$

Then, the subroutine advances to Step 2202.

At Step 2202, the sign of the shot distance PanShotDistance is checked. If PanShotDistance≧0, then the camera is panned in the CW direction, so that the subroutine advances to Step 2204, and PanningDir is set to PanningDir=CW. Then, the subroutine advances to Step 2205. And if, at Step 2202, PanShotDistance<0, then the camera is panned in the CCW direction, so that the subroutine advances to Step 2203, and PanningDir is set to PanningDir=CCW. Then, the subroutine advances to Step 2205.

At Step 2205, the output timing Tsp at which the panning control signal is output to the D/A converter c 304 for panning control (see FIG. 3) is calculated using Expression (14).

$$Tsp=ShotDriveTime/ABS(PanShotDistance) \quad (14)$$

Here, ABS(x) is a function calculating the absolute value of x. Then, the subroutine ends.

Referring to FIG. 21, the following is a description of the tilting distance calculation subroutine (CalcTiltingDistance).

At Step 2301, the distance TiltShotDistance between the current tilting position TiltCurPos and the tilting shot position TiltShotPos is calculated using Expression (15):

$$TiltShotDistance=TiltShotPos-TiltCurPos \quad (15)$$

Then, the subroutine advances to Step 2302.

At Step 2302, the sign of the shot distance TiltShotDistance is checked. If TiltShotDistance≧0, then the camera is tilted in the UPPER direction, so that the subroutine advances to Step 2304, and TiltingDir is set to TiltingDir=UPPER. Then, the subroutine advances to Step 2305. And if, at Step 2302, TiltShotDistance<0, then the camera is tilted in the LOWER direction, so that the subroutine advances to Step 2303, and TiltingDir is set to TiltingDir=LOWER. Then, the subroutine advances to Step 2305.

At Step 2305, the output timing Tst at which the tilting control signal is output to the D/A converter d 404 for tilting control (see FIG. 4) is calculated using Expression (16).

$$Tst=ShotDriveTime/ABS(TiltShotDistance) \quad (16)$$

Here, ABS(x) is a function calculating the absolute value of x. Then, the subroutine ends.

Referring to FIG. 22, the following is a description of the zooming distance calculation subroutine (CalcZoomingDistance).

At Step 2401, the distance ZoomShotDistance between the current zooming position ZoomCurPos and the zooming shot position ZoomShotPos is calculated using Expression (17):

$$ZoomShotDistance=ZoomShotPos-ZoomCurPos \quad (17)$$

Then, the subroutine advances to Step 2402.

At Step 2402, the sign of the shot distance ZoomShotDistance is checked. If ZoomShotDistance≧0, then zooming in the TELE direction is performed, so that the subroutine advances to Step 2404, and ZoomingDir is set to ZoomingDir=TELE. Then, the subroutine advances to Step 2405. And if, at Step 2402, ZoomShotDistance<0, then zooming the WIDE direction is performed, so that the subroutine advances to Step 2403, and ZoomingDir is set to ZoomingDir=WIDE. Then, the subroutine advances to Step 2405.

At Step 2405, the output timing Tsz at which the zooming control signal is output to the D/A converter b 204 for zooming control (see FIG. 2) is calculated using Expression (18).

$$Tsz=ShotDriveTime/ABS(ZoomShotDistance) \quad (18)$$

Here, ABS(x) is a function calculating the absolute value of x. Then, the subroutine ends.

Referring to FIG. 23, the following is a description of the focusing distance calculation subroutine (CalcFocusingDistance).

At Step 2501, the distance FocusShotDistance between the current focusing position FocusCurPos and the focusing shot position FocusShotPos is calculated using Expression (19):

$$FocusShotDistance=FocusShotPos-FocusCurPos \quad (19)$$

Then, the subroutine advances to Step 2502.

At Step 2502, the sign of the shot distance FocusShotDistance is checked. If FocusShotDistance≧0, then focusing in the MOD direction is performed, so that the subroutine advances to Step 2504, and FocusingDir is set to FocusingDir=MOD. Then, the subroutine advances to Step 2505. And if, at Step 2502, FocusShotDistance<0, then focusing the INF direction is performed, so that the subroutine advances to Step 2503, and FocusingDir is set to FocusingDir=INF. Then, the subroutine advances to Step 2505.

At Step 2505, the output timing Tsf at which the focus control signal is output to the D/A converter a 202 for focus control is calculated using Expression (20).

$$Tsf=ShotDriveTime/ABS(FocusShotDistance) \quad (20)$$

Here, ABS(x) is a function calculating the absolute value of x. Then, the subroutine ends.

Referring to FIG. 24, the following is a description of the panning D/A output subroutine (PanningDaOutput).

At Step 2601, the data for the output from the D/A converter c 304 (see FIG. 3), which is a 16-bit D/A converter, is calculated using Expression (21):

$$PanDaData=PanCurPos \times 65535/PanCwPos \quad (21)$$

Then, the subroutine advances to Step 2602.

At Step 2602, PanDaData is set in the D/A converter c 304 for panning control. Then, the subroutine ends.

Referring to FIG. 25, the following is a description of the tilting D/A output subroutine (TiltingDaOutput).

At Step 2701, the data for the output from the D/A converter d 404 (see FIG. 4), which is a 16-bit D/A converter, is calculated using Expression (22):

$$TiltDaData = TiltCurPos \times 65535 / TiltUpperPos \qquad (22)$$

Then, the subroutine advances to Step 2702.

At Step 2702, TiltDaData is set in the D/A converter d 404 for tilting control. Then, the subroutine ends.

Referring to FIG. 26, the following is a description of the zooming D/A output subroutine (ZoomingDaOutput).

At Step 2801, the data for the output from the D/A converter b 204, which is a 16-bit D/A converter, is calculated using Expression (23):

$$ZoomDaData = ZoomCurPos \times 65535 / ZoomTelePos \qquad (23)$$

Then, the subroutine advances to Step 2802.

At Step 2802, ZoomDaData is set in the D/A converter b 204 for zooming control. Then, the subroutine ends.

Referring to FIG. 27, the following is a description of the focusing D/A output subroutine (FocusingDaOutput).

At Step 2901, the data for the output from the D/A converter a 202, which is a 16-bit D/A converter, is calculated using Expression (24):

$$FocusDaData = FocusCurPos \times 65535 / FocusModPos \qquad (24)$$

Then, the subroutine advances to Step 2902.

At Step 2902, FocusDaData is set in the D/A converter a 202 for focus control. Then, the subroutine ends.

Embodiment 1

With the above-described pan-tilt zoom image-taking system capable of synchronized shot operation as the premise, Embodiment 1 of the present invention describes the structure and the control of a pan-tilt zoom image-taking system for the case that a pseudo-synchronized shot operation is performed only for zooming.

Figure 28:
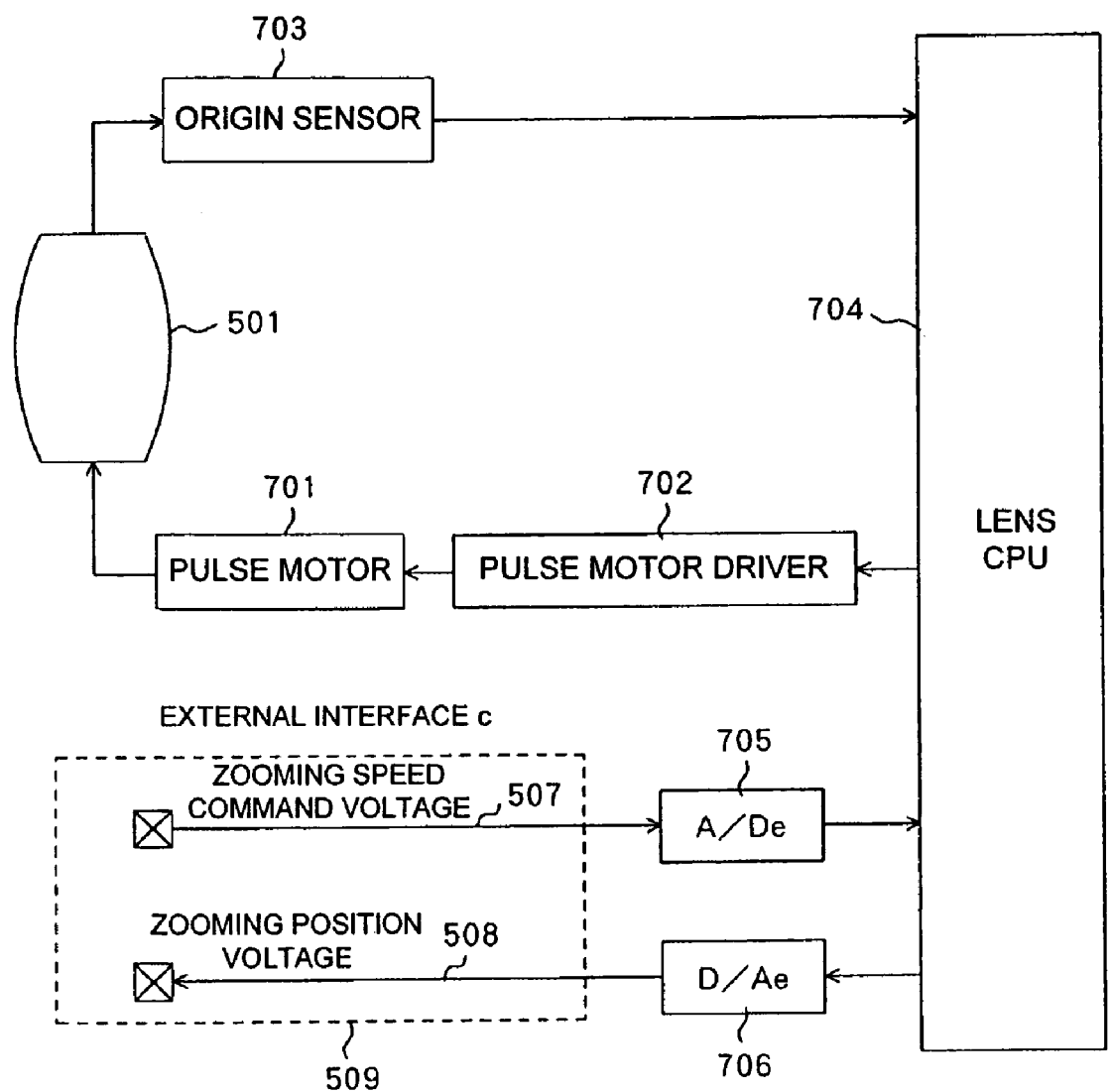
FIG. 28 shows the structure of a zoom lens control circuit in a pan-tilt zoom image-taking system according to Embodiment 1 of the present invention.

First, referring to FIG. 28, a zoom lens control circuit is described, which can be used instead of the zoom lens control circuit shown in FIG. 5.

Numerical reference 704 denotes a lens CPU, which controls the pulse motor 701 driving the zoom lens 501. The lens CPU 704 outputs the zooming position voltage 508 via a D/A converter e 706 to the external interface c 509.

The zooming speed command voltage 507 input into the external interface c 509 is input via an A/D converter e 705 into the lens CPU 704. It should be noted that the A/D converter e 705 also may be incorporated in the lens CPU 704.

The lens CPU 704 outputs a control signal to a pulse motor driver 702, which outputs a driving signal to the pulse motor 701 in response to this control signal. The output of the pulse motor 701 is transmitted to the zoom lens 501 (including its driving mechanism).

In this structure, in order to control the zoom lens 501 using a relative position to a predetermined initial position, the zoom lens 501 is connected to an origin sensor 703 for detecting whether the zoom lens 501 is positioned in the initial position. By inputting the output of the origin sensor 703 to the lens CPU 704, the lens CPU 704 can detect when the zoom lens 501 is positioned in the initial position.

Moreover, the telephoto end and the wide-angle end of the zoom lens 501 are monitored by driving pulses of the pulse motor 701. That is to say, when the pulse motor 701 is driven for a predetermined number of pulses from the initial position detected by the origin sensor 703 to the telephoto side, then the zoom lens 501 reaches the telephoto end, and when the pulse motor 701 is driven for a predetermined number of pulses from the initial position to the wide-angle side, then the zoom lens 501 reaches the wide-angle end.

Figure 29:
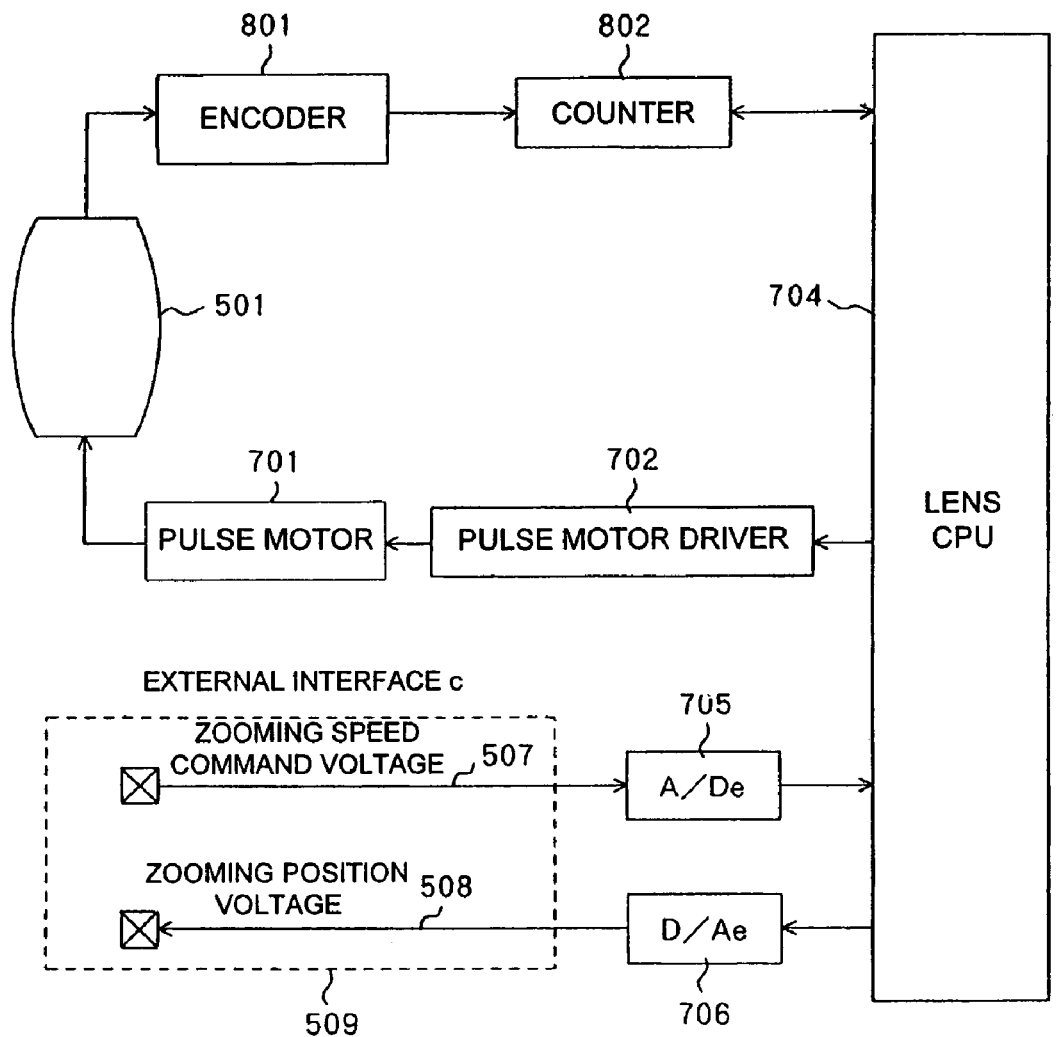
FIG. 29 shows the structure of another zoom lens control circuit in the pan-tilt zoom image-taking system according to Embodiment 1 of the present invention.

Referring to FIG. 29, another zoom lens control circuit is described, which can be used instead of the zoom lens control circuit shown in FIG. 28. It should be noted that in the zoom lens control circuit in FIG. 29, only a portion of the zoom lens control circuit shown in FIG. 28 has been changed, and structural elements that are shared with the zoom lens control circuit shown in FIG. 28 are given the same reference numerals as in FIG. 28.

The lens CPU 704 controls the pulse motor 701 driving the zoom lens 501. The lens CPU 704 outputs the zooming position voltage 508 via the D/A converter e 706 to the external interface c 509.

The zooming speed command voltage 507 input into the external interface c 509 is input via the A/D converter e 705 into the lens CPU 704. It should be noted that the A/D converter e 705 also may be incorporated in the lens CPU 704.

The lens CPU 704 outputs a control signal to the pulse motor driver 702, which outputs a driving signal to the pulse motor 701 in response to this control signal. The output of the pulse motor 701 is transmitted to the zoom lens 501 (including its driving mechanism).

The zoom lens 501 is connected to an encoder 801, which outputs a pulse signal for every predetermined movement amount of the zoom lens 501. The output of the encoder 801 is input into a counter 802. The lens CPU 704 reads the counter value of this counter 802.

In this case, there is a Z-phase in the encoder 801, and by reading this Z-phase via the counter 802 with the lens CPU 704, it is possible to detect an initial position of the zoom lens 501. Therefore, by reading the counter value from the initial position of the counter 802, it is possible to detect the position of the zoom lens 501.

In this structure, even when the zoom lens 501 becomes out of step during the driving with the pulse motor 701, the pulse train output from the encoder 801 is read via the counter 802, making a correction of the step-out possible. Moreover, the telephoto end and the wide-angle end of the zoom lens 501 can be managed by the driving pulses of the pulse motor 701 or the counter value of the counter 802. That is to say, if the pulse motor 701 is driven toward the telephoto side for a predetermined number of pulses from the output position (initial position) of the Z-phase of the encoder 801, then the zoom lens 501 reaches the telephoto end, and if the pulse motor 701 is driven toward the wide-angle side for a predetermined number of pulses from the initial position, then the zoom lens 501 reaches the wide-angle end.

Figure 30:
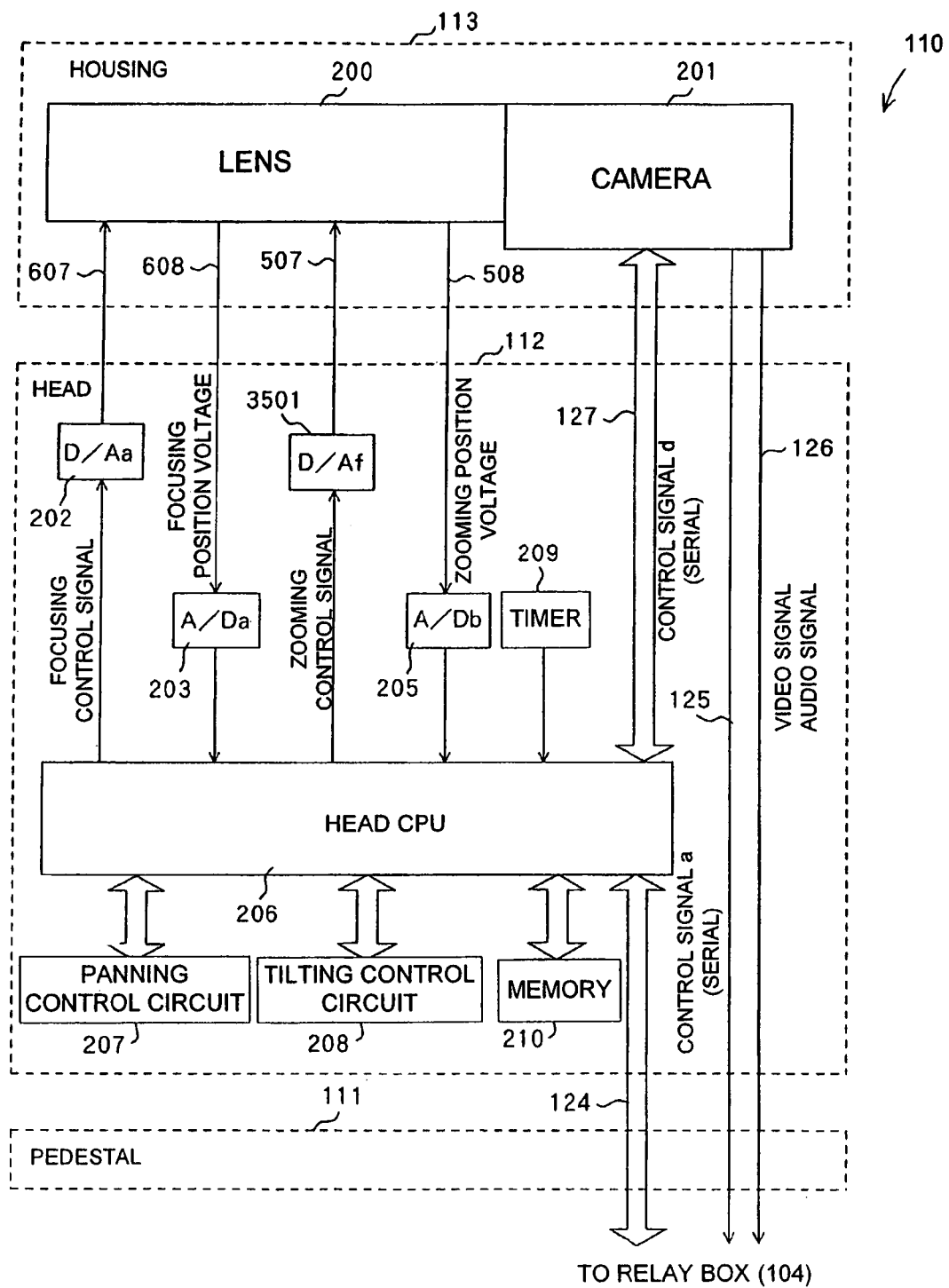
FIG. 30 shows the structure of an electrical circuit of a head unit in the pan-tilt zoom image-taking system according to Embodiment.

Referring to FIG. 30, the following is a description of the electrical circuit structure of a head unit corresponding to the zoom lens control circuits shown in FIG. 28 and 29. It should be noted that structural elements which are the same in the electrical circuit shown in FIG. 2 have been given the same numerals as in FIG. 2.

A camera unit made of an image-taking lens 200 and a video camera 201 is mounted on the housing 113 of this head unit 110. The control unit inside the main head 112 includes a head CPU 206 functioning as a lens and camera controller as well as a means for communication with the relay box.

The head CPU 206 takes the control timing of the head unit 110 while referencing the clock count of a timer 209, and controls/oversees the various operations of the head unit 110.

Furthermore, as shown in FIGS. 11 and 19, the head CPU 206 performs such arithmetic processing as the storing of shot position data to a memory 210 and the reading of the stored shot position data. The head CPU 206 also sends a control signal d 127 to the camera 201, and performs such controls as white balance or gain adjustment of the camera 201.

The control unit is further provided with a panning control circuit 207 and a tilting control circuit 208, which control the panning mechanism and the tilting mechanism in response to control signals from the CPU 206.

The head CPU 206 also controls the operation of a zooming mechanism (drivable part) and a focusing mechanism (drivable part) of the image-taking lens 200. A focus control signal from the head CPU 206 is sent via a D/A converter a 202 as a focusing position command voltage 607 to the image-taking lens 200, and control the focusing mechanism. A focusing position voltage 608 indicating the position of a focusing mechanism (focus lens) is input from the image-taking lens 200 via an A/D converter a 203 into the head CPU 206.

A zooming control signal from the head CPU 206 is input into a D/A converter f 3501. The output of the D/A converter f 3501 is sent as the zooming speed command voltage 507 to the lens 200, and drives the zooming mechanism. The zooming position voltage 508 indicating the position of the zooming mechanism (zoom lens) is sent from the lens 200 through the A/D converter b 205 to the head CPU 206.

The head CPU 206 performs the communication of a control signal a 124 with a relay box 104 and the communication of a control signal d 127 with the camera 201. Moreover, a video signal 125 and an audio signal 126 output from the camera 201 are sent through a pedestal 111 to the relay box 104.

Here, the D/A converter f 3501 for the zooming control is an 8-bit D/A converter, and for 0x00 to 0x7F, the zoom lens 501 is zoomed in the wide-angle direction, whereas for 0x81 to 0xFF, the zoom lens 501 is zoomed in the telephoto direction. 0x80 is taken as the stop instruction. In consideration of noise and the like, it is also possible to provide a certain margin and designate 0x80±0x05 as the stop instruction.

However, a dead zone near 0x80 is also present when the zoom lens control circuit of the image-taking lens 200 is of the type which performs control with a zooming speed table as shown in the table of FIG. 31.

Referring to FIG. 31, the following is a description of a speed table for zooming control. In the following, the table shown in FIG. 31 is referred to as "zooming speed table".

In the zoom lens control circuits shown in FIGS. 28 and 29, the zooming speed command voltage 507 input from the control unit in the main head 112 is A/D converted by the A/D converter e 705, and zooming is performed by driving the pulse motor 701 with the lens CPU 704, in response to this A/D converted zooming speed command data.

In the image-taking lens 200 having such a zoom lens control circuit, the A/D converter e 705 is an A/D converter about 8 bits wide, and noise can be prevented from being mixed into the output data of the A/D converter e 705, so that the zooming speed does not change continuously, and it may be possible to select only about eight speeds.

Addressing this problem, the present embodiment is for the case that the A/D converter e 705 is an 8-bit A/D converter, and eight speeds each can be selected for the telephoto direction and for the wide-angle direction. FIG. 31 is an example of the relation between the A/D values and the zooming speeds. Here, the number of driving pulses for the total zoom region of the zoom lens 501 is 5000, and for the 8-bit A/D converter values, 0x00 to 0x7F are taken as the wide-angle direction, 0x81 to 0xFF are taken as the telephoto direction, with 0x80 as the center value (stop). Moreover, the Example in FIG. 31 shows differential data with 0x80 as the center. The zooming speeds, including the stopped state, are defined as having a certain margin with respect to the A/D conversion values.

In this case, when the zooming speeds at the various speed levels of the speed command values are defined as shown in the table, then the total region drive times are determined as shown in the table. Moreover, the 8-bit speed command value corresponding to the A/D value of the zooming speed command voltage 507 input into the external interface c 509 is taken as the center value of the range of A/D values for each of the speed levels. This setting of the speed command values provides better protection against noise.

Now, when such a zoom lens control circuit is provided, then it is difficult to let the zooming always start substantially simultaneously and end substantially simultaneously with the panning and the tilting (that is, to perform a synchronized shot operation), as in the above-described synchronized shot operation. That is to say, since the zooming speed can only be set in steps, zooming may not be possible at the most suitable zooming speed for synchronized shot operation.

In order to address this problem, if an operation start and operation stop which are simultaneous with the panning, tilting and focusing are difficult when zooming (when the zooming speed most suitable for simultaneous operation start and simultaneous operation stop cannot be selected), then, based on the current position of the zoom lens 501, the shot position (target position) and the shot drive time (target operation time) set through the operation box 101, a zooming speed is determined from the table in FIG. 31 with which the camera can be zoomed from the current position to the shot position in an operation time that is as close as possible to the shot drive time. Then, a pseudo-synchronized shot operation is realized by delaying the zooming start for a time corresponding to the difference (time difference) between the shot drive time and the actually needed anticipated operation time (anticipated operation time).

Figure 36:
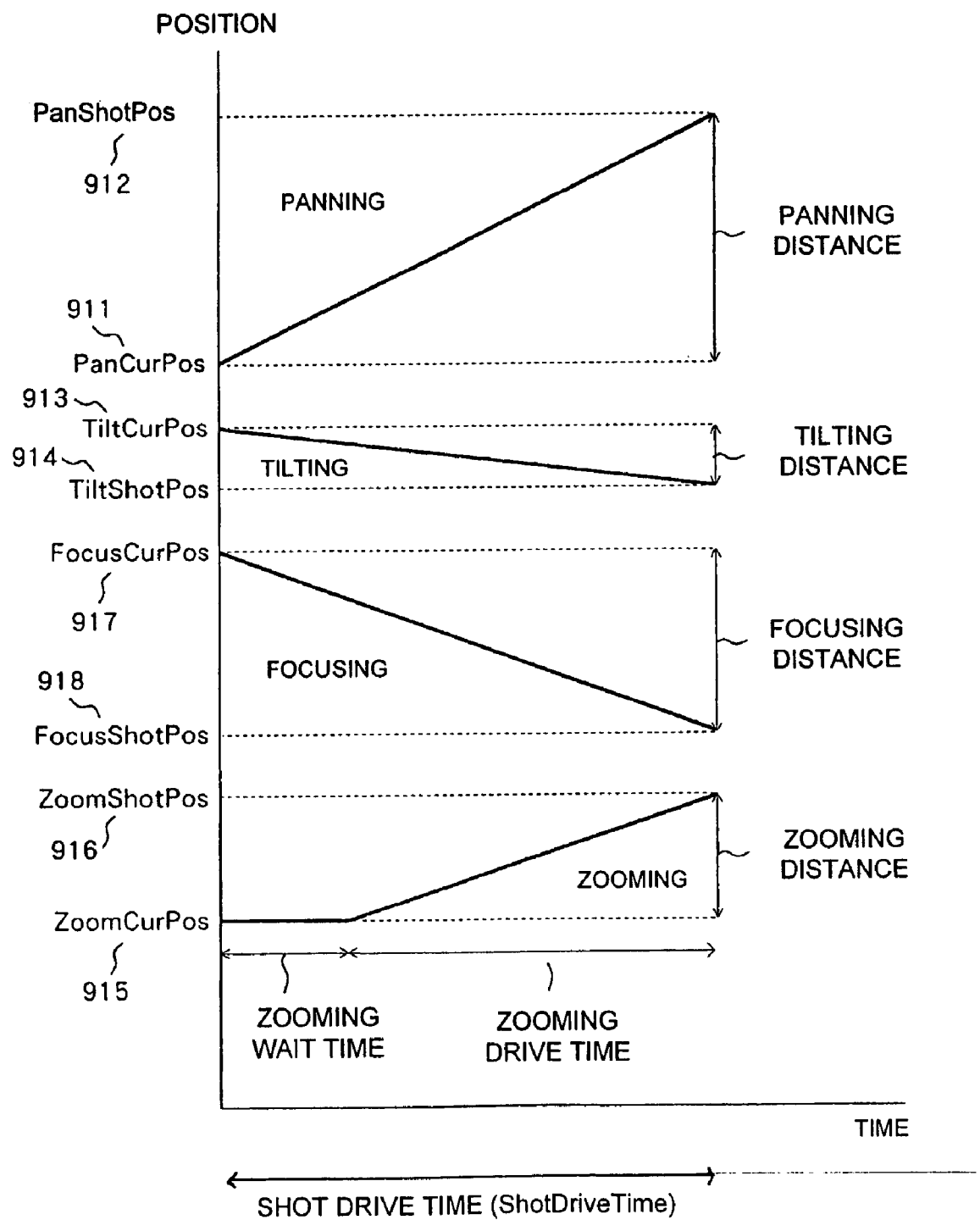
FIG. 36 is a conceptual diagram illustrating a pseudo-synchronized shot operation.

This concept is explained with reference to FIG. 36. Here, the current panning, tilting, zooming and focusing positions are:

| | |
|---|---|
| current panning position: | PanCurPos (911) |
| current tilting position: | TiltCurPos (913) |
| current zooming position: | ZoomCurPos (915) |
| current focusing position: | FocusCurPos (917) |

Moreover, the shot positions set (stored) through the operation box 101 are:

| | |
|---|---|
| panning shot position: | PanShotPos (912) |
| tilting shot position: | TiltShotPos (914) |
| zooming shot position: | ZoomShotPos (916) |
| focusing shot position: | FocusShotPos (918) |

Then, panning, tilting, zooming and focusing from the above-noted current positions to the above-noted shot positions is performed within the shot drive time ShotDriveTime set through the operation box 101. Here, the zooming shot operation cannot be synchronized with the other shot operations, but it is possible to finish the zooming shot operation substantially simultaneously with the other shot operations (pseudo-synchronized shot operation) by performing, after the shot operation start command, the zooming operation after waiting for a zooming wait time corresponding to the difference between the shot drive time (target operation time) and the actually needed operation time (anticipated operation time), and carrying out the zooming operation for the anticipated operation time at a speed at which this zooming wait time becomes minimal.

Figure 32:
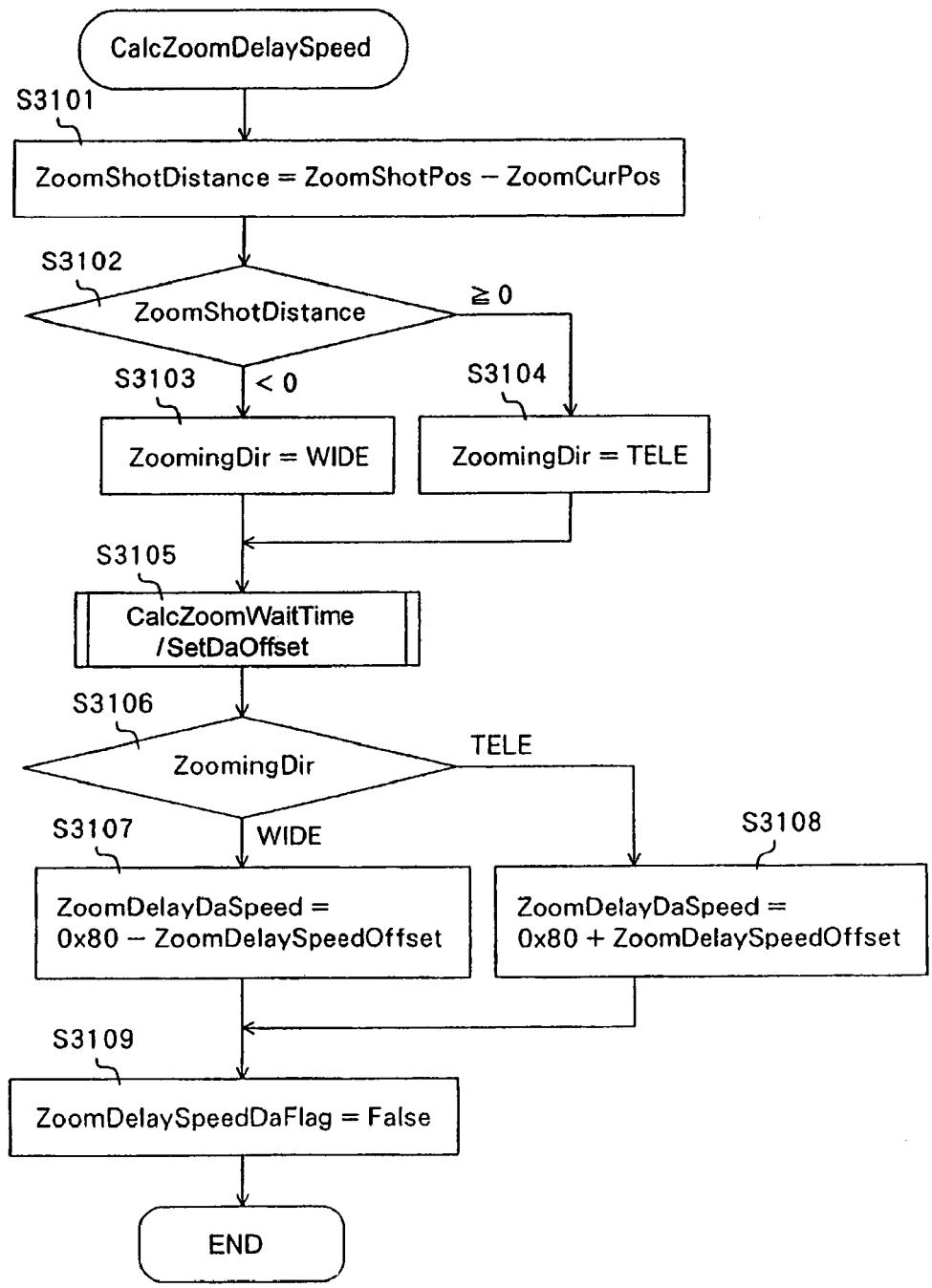
FIG. 32 is a flowchart of a zooming delay driving calculation subroutine for the pseudo-synchronized shot operation in Embodiment 1.

Referring to FIG. 32, the following is an explanation of the zooming delay driving calculation subroutine (CalcZoomDelaySpeed), which is called instead of the zooming distance calculation subroutine (CalcZoomingDistance) shown in FIG. 22.

First, at Step 3101, the distance ZoomShotDistance between the current zooming position ZoomCurPos and the zooming shot position ZoomShotPos is calculated using Expression (25) (same as Expression (17)):

$$\text{ZoomShotDistance}=\text{ZoomShotPos}-\text{ZoomCurPos} \quad (25)$$

Then, the subroutine advances to Step 3102.

At Step 3102, the sign of the shot distance ZoomShotDistance is checked. If ZoomShotDistance≧0, then zooming in the TELE direction is performed, so that the subroutine advances to Step 3104, and ZoomingDir is set to ZoomingDir=TELE. Then, the subroutine advances to Step 3105. And if, at Step 3102, ZoomShotDistance<0, then zooming in the WIDE direction is performed, so that the subroutine advances to Step 3103, and ZoomingDir is set to ZoomingDir=WIDE. Then, the subroutine advances to Step 3105.

Figure 33:
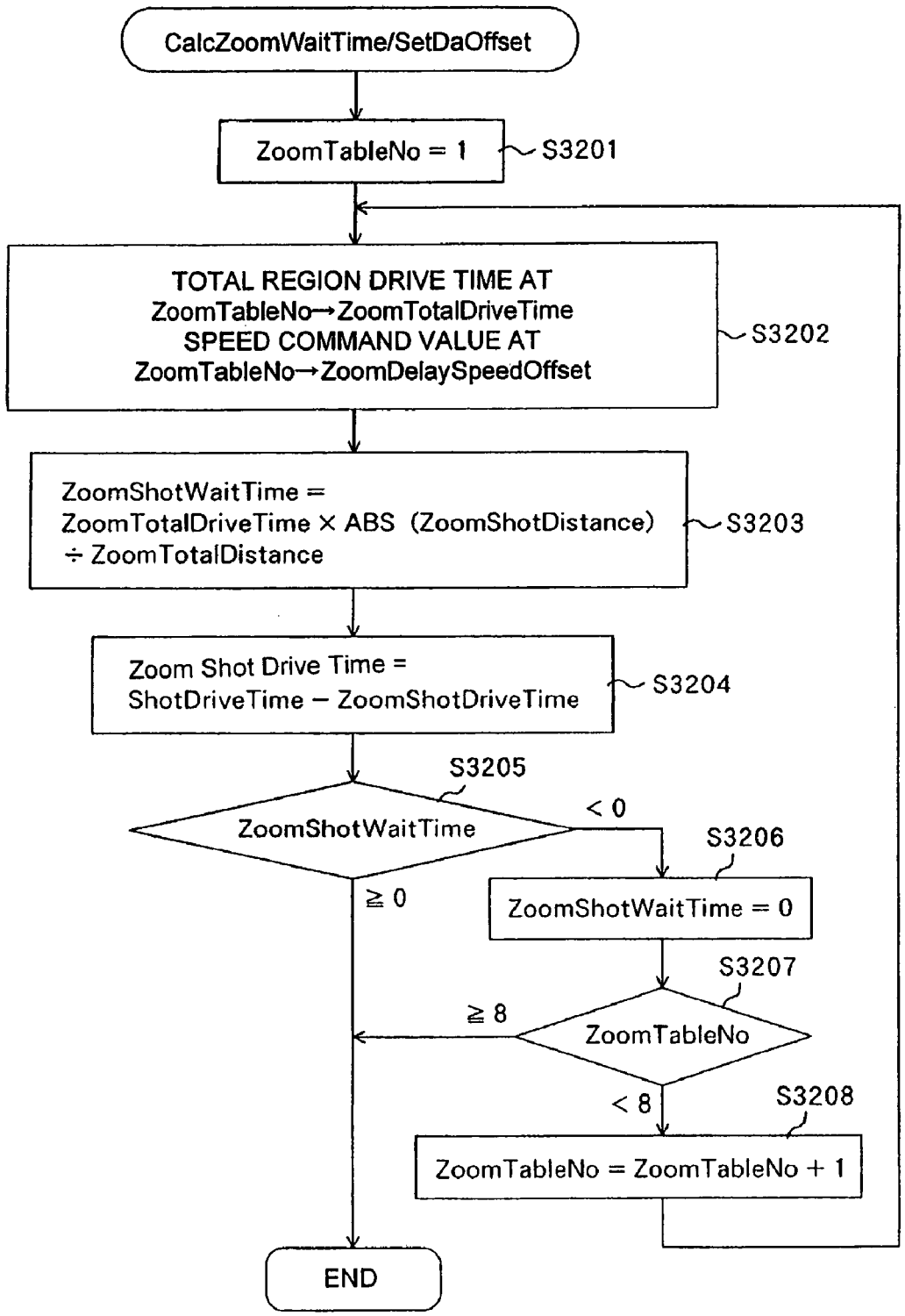
FIG. 33 is a flowchart of a zooming wait time calculation—offset setting subroutine for the pseudo-synchronized shot operation.

At Step 3105, the zooming wait time calculation/D/A offset setting subroutine (CalcZoomWaitTime/SetDaOffset) shown in FIG. 33 is called in order to calculate the zoom driving waiting time. Then, the subroutine advances to Step 3106.

At Step 3106, the zoom driving direction is checked. If ZoomingDir=TELE, then the subroutine advances to Step 3108, and the zooming D/A conversion value (ZoomDelayDaSpeed) is calculated with Expression (26), using the offset value (referred to below as "D/A offset value") ZoomDelaySpeedOffset for determining the optimum speed command value D/A conversion value, which was set in the zooming wait time calculation/D/A offset setting subroutine.

$$\text{ZoomDelayDaSpeed}=0x80+\text{ZoomDelaySpeedOffset} \quad (26)$$

Then, the subroutine advances to Step 3109.

At Step 3106, if ZoomingDir=WIDE, the subroutine advances to Step 3107 and calculates the zooming D/A conversion value ZoomDelayDaSpeed with Expression (27), using the above-noted offset value ZoomDelaySpeedOffset calculated in the zooming wait time calculation/D/A offset setting subroutine.

$$\text{ZoomDelayDaSpeed}=0x80-\text{ZoomDelaySpeedOffset} \quad (27)$$

Then, the subroutine advances to Step 3109.

At Step 3109, a D/A output termination flag ZoomDelaySpeedDaFlag, which indicates whether the D/A conversion value (ZoomDelayDaSpeed) has already been output after the zooming wait time has passed, is set to false, that is, set to a state indicating that the D/A conversion value has not yet been output. Then, the subroutine ends.

Referring to FIG. 33, the following is a description of a zooming wait time calculation/D/A offset setting subroutine (CalcZoomWaitTime/SetDaOffset), which calculates the zooming wait time and sets the D/A offset value.

First, at Step 3201, the table number (number in the left-most column in FIG. 31) is initialized in order to search the zooming speed table:

ZoomTableNo=1

Then, the subroutine advances to Step 3202.

At Step 3202, the total region drive time corresponding to the table number ZoomTableNo is read from the zooming speed table, and the total region drive time ZoomTotalDriveTime is set to this value.

Similarly, ZoomDelaySpeedOffset is set to the speed command value corresponding to the table number ZoomTableNo. Then, the subroutine advances to Step 3203.

At Step 3203, the zooming drive time (anticipated operation time) ZoomShotDriveTime anticipated to be needed when zooming for the zooming distance ZoomShotDistance at the speed corresponding to the speed command value is calculated with Expression (28):

$$\text{ZoomShotDriveTime}=\text{ZoomTotalDriveTime}\times\text{ABS}(\text{ZoomShotDistance})/\text{ZoomTotalDistance} \quad (28)$$

Here, ABS(x) is a function calculating the absolute value of x. Moreover, the number of driving pulses over the total zoom region ZoomTotalDistance is ZoomTotalDistance=5000. Then, the subroutine advances to Step 3204.

At Step 3204, the zooming wait time ZoomShotWaitTime is calculated using Expression (29) from the zooming drive time ZoomShotDriveTime and the shot drive time ShotDriveTime, which is the shot time (target operation time) set for and shared by panning, tilting, zooming and focusing.

$$\text{ZoomShotWaitTime}=\text{ShotDriveTime}-\text{ZoomShotDriveTime} \quad (29)$$

Then, the subroutine advances to Step 3205.

At Step 3205, the sign of the zooming wait time ZoomShotWaitTime is checked. If ZoomShotWaitTime≧0, then the subroutine ends. On the other hand, if ZoomShotWaitTime<0, then the subroutine advances to Step 3206, and ZoomShotWaitTime is set to ZoomShotWaitTime=0. Then, the subroutine advances to Step 3207.

At Step 3207, the table number ZoomTableNo is checked to determine whether the search of the zooming speed table has been finished or not. In the zooming speed table shown in FIG. 31, besides the table number 0 for the case of stop, there are the table numbers 1 to 8, so if ZoomTable≧8, then the search of the zooming speed table has finished, and the subroutine ends. If ZoomTableNo<8, then the search of the zooming speed table has not yet finished, and the subroutine advances to Step 3208.

At Step 3208, the table number is incremented in order to set the next table number:

$$\text{ZoomTableNo}=\text{ZoomTableNo}+1 \quad (30)$$

Then, the subroutine advances to Step 3202.

In the present embodiment, every time the table number ZoomTableNo is incremented by 1, the zooming speed (speed command value) becomes slower. For this reason, the speed command value corresponding to the table number ZoomTableNo at which ZoomShotWaitTime≧0 for the first time at Step 3205 corresponds to the one of the eight selectable zooming speeds at which the zooming wait time is the shortest (i.e. the lowest speed at which the zooming shot operation can be finished within the shot drive time). Thus, in the present embodiment, for the case of a pseudo-synchronized shot operation, when the start of the zooming shot operation is delayed after that of the other shot operations, then control is performed such that this delay becomes as short as possible, and the irritating feeling during the image-taking caused by the zooming delay at the shot operation start is made as small as possible.

It should be noted that it is also possible to gradually decrement the table number ZoomTableNo starting with 8, and set ZoomDelaySpeedOffset to the speed command value corresponding to the table number ZoomTableNo at which ZoomShotWaitTime≧0 for the first time at Step 3205. In this case, the speed command value to which ZoomDelaySpeedOffset is set corresponds to the one of the eight selectable zooming speeds at which the zooming wait time is the longest (i.e. the highest speed at which the zooming shot operation can be finished within the shot drive time).

For example, if zooming is performed together with panning and tilting, then the field angle on the telephoto side is narrow, so that it may not be clear from the taken images what is being taken by panning and tilting (that is, to where the image-taking direction is changed, etc.). Therefore, when zooming from the wide-angle side to the telephoto side, it may also be advantageous to choose a zooming speed (speed command value) with which the zooming wait time becomes the longest, and to maintain a broad field angle as long as possible.

Figure 34:
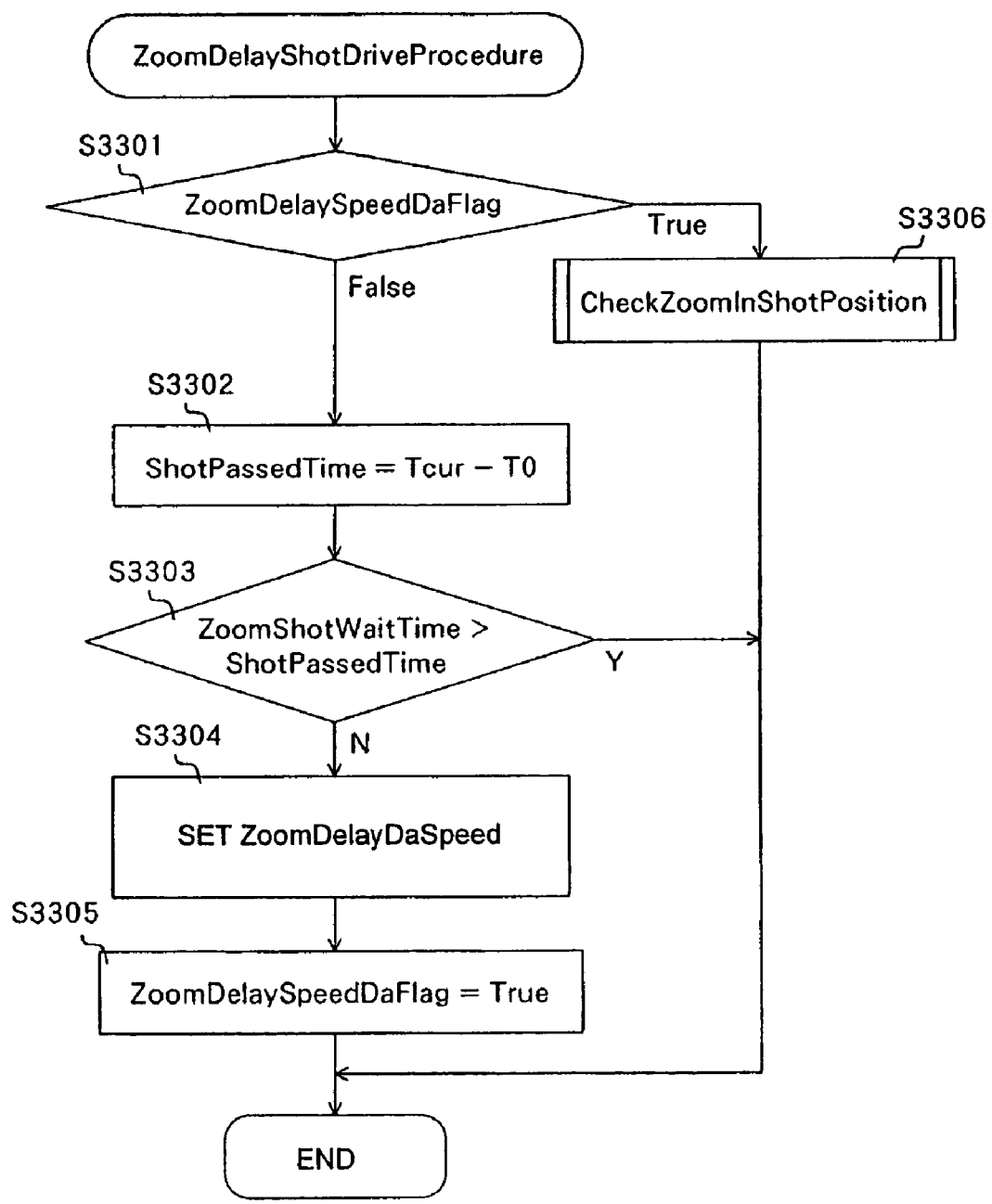
FIG. 34 is a flowchart of a zooming delay shot operation subroutine for the pseudo-synchronized shot operation.

Referring to FIG. 34, the following is a description of a zooming delay shot operation subroutine (ZoomDelayShotDriveProcedure), for starting the zooming shot operation after waiting for the zooming wait time calculated in the above-noted zooming wait time/offset value calculation subroutine, performed after the shot operation command.

This routine is called instead of the zooming shot operation subroutine (ZoomShotDriveProcedure) shown in FIG. 17.

First, at Step 3301, the D/A output termination flag ZoomDelaySpeedDaFlag is looked up, in order to check whether the D/A conversion value (ZoomDelayDaSpeed) already has been output after the zooming wait time has passed.

Figure 35:
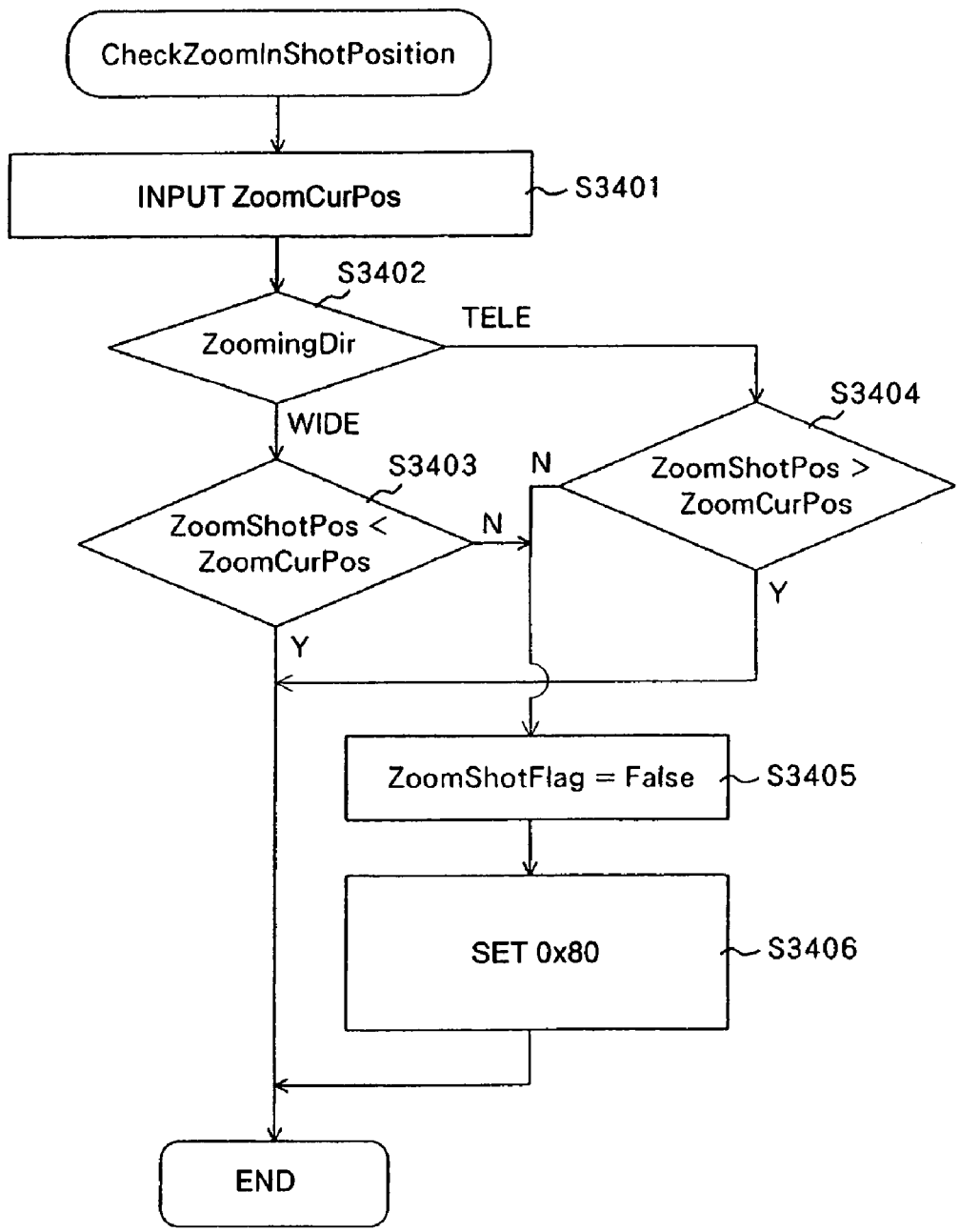
FIG. 35 is a flowchart of a shot position finish subroutine for the pseudo-synchronized shot operation.

If ZoomDelaySpeedDaFlag=True, then the subroutine advances to Step 3306, and the zooming shot finish check subroutine (CheckZoomInShotPosition) shown in FIG. 35 is called to determine whether the zoom has reached the shot position. Then, the subroutine ends. On the other hand, if at Step 3301 ZoomDelaySpeedDaFlag=False, then the subroutine advances to Step 3302, because the zooming wait time has not elapsed yet.

At Step 3302, the passed zooming wait time ShotPassedTime is calculated with Expression (31) from the shot operation start time (time at which the shot operation was commanded) T0 and the current time Tcur.

$$ShotPassedTime = Tcur - T0 \quad (31)$$

Then, the subroutine advances to Step 3303.

At Step 3303, the zooming wait time is compared with the passed time calculated at Step 3302. If ZoomShotWaitTime>ShotPassedTime is given, then the zooming wait time has not yet elapsed, so that the subroutine ends. On the other hand, if ZoomShotWaitTime>ShotPassedTime is not given, then the zooming wait time has elapsed, so that the subroutine advances to Step 3304.

At Step 3304, the D/A converter f 3501 for zooming control (see FIG. 30) is set to the ZoomDelayDaSpeed data calculated in the zooming delay driving calculation subroutine of FIG. 32. Then, the subroutine advances to Step 3305.

At Step 3305, the setting of the data into the D/A converter f 3051 has been finished, so that the D/A output termination flag ZoomDelayDaFlag is set to True. Then, the subroutine ends.

Referring to FIG. 35, the following is a description of the zooming shot finish check subroutine (CheckZoomInShotPosition)

First, at Step 3401, the current zooming position ZoomCurPos is detected with the signal from the A/D converter b 205. Then, the subroutine advances to Step 3402.

At Step 3402, the current zooming drive direction is checked. If ZoomingDir=TELE, then the subroutine advances to Step 3404, and it is checked whether the shot position has been reached.

At Step 3404, since the zoom is currently driven in the telephoto direction, it is checked with Expression (32) whether the shot position has been reached or exceeded:

$$ZoomShotPos > ZoomCurPos \quad (32)$$

If Expression (32) is given, then the shot position has not yet been reached, so that the subroutine ends. On the other hand, if Expression (32) is not given, then the shot position has been reached, so that the subroutine advances to Step 3405.

At Step 3402, if ZoomingDir=WIDE, then the subroutine advances to Step 3403, and it is checked whether the shot position has been reached.

At Step 3403, since the zoom is currently driven in the wide-angle direction, it is checked with Expression (33) whether the shot position has been reached or exceeded:

$$ZoomShotPos < ZoomCurPos \quad (33)$$

If Expression (33) is given, then the shot position has not yet been reached, so that the subroutine ends. On the other hand, if Expression (33) is not given, then the shot position has been reached, so that the subroutine advances to Step 3405.

At Step 3405, since the shot position has been reached, ZoomShotFlag is set to ZoomShotFlag=False to indicate that the zooming shot operation has finished. Then, the subroutine advances to Step 3406.

At Step 3406, the D/A converter f 3501 for zooming control is set to 0x80 to stop the zooming. Then, the subroutine ends.

With the present embodiment as described above, it is not possible to select a zooming speed with which the zooming shot operation can be synchronized (simultaneous operation start and simultaneous operation end) with the other shot operations, but by delaying the start of the zooming shot operation by the temporal difference to the other shot operations, the end of the zooming shot operation can be made substantially simultaneous with that of the other shot operations, so that it is possible to achieve a pseudo-synchronized shot operation.

Embodiment 2

In Embodiment 1, a case of pseudo-synchronized shot operation was described in which the start of the zooming shot operation is delayed after the start of the other shot operations, regardless of the zooming direction (telephoto direction or wide-angle direction), but there are also other methods.

In the case of a shot operation including a zooming operation, it is advantageous to confirm the movement directions with which more video information is displayed on the monitor (that is, which has the broader field angle).

Figure 37A:
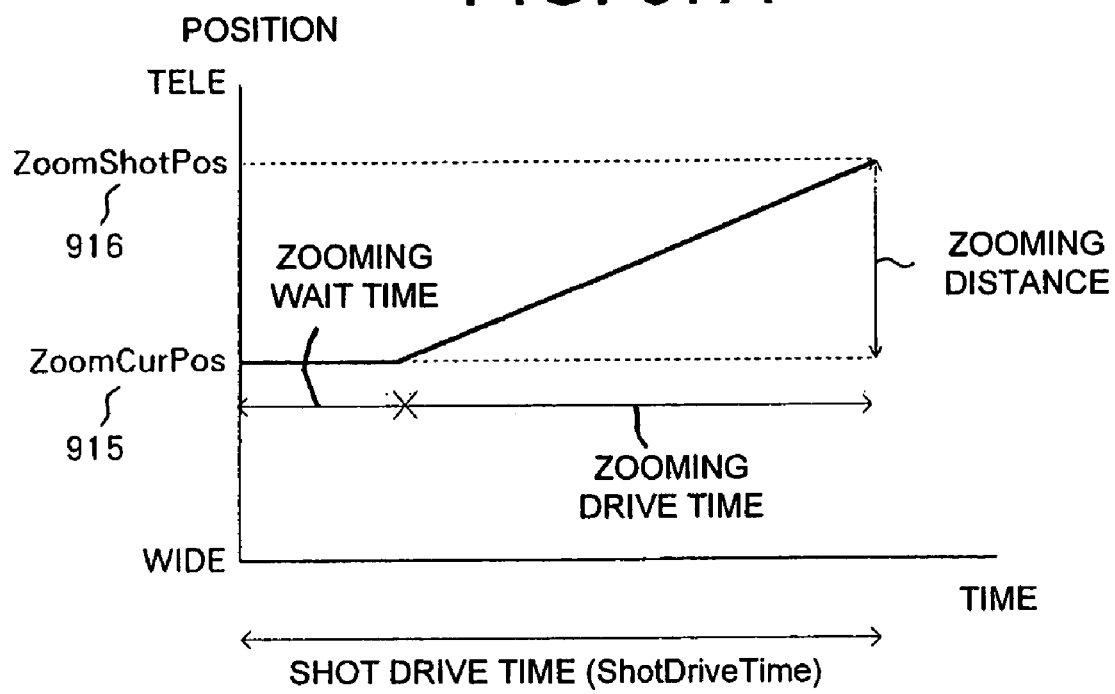
FIG. 37 shows conceptual diagrams illustrating a wide-angle prioritizing pseudo-synchronized shot operation with a pan-tilt zoom image-taking system according to Embodiment 2 of the present invention.
Figure 37B:
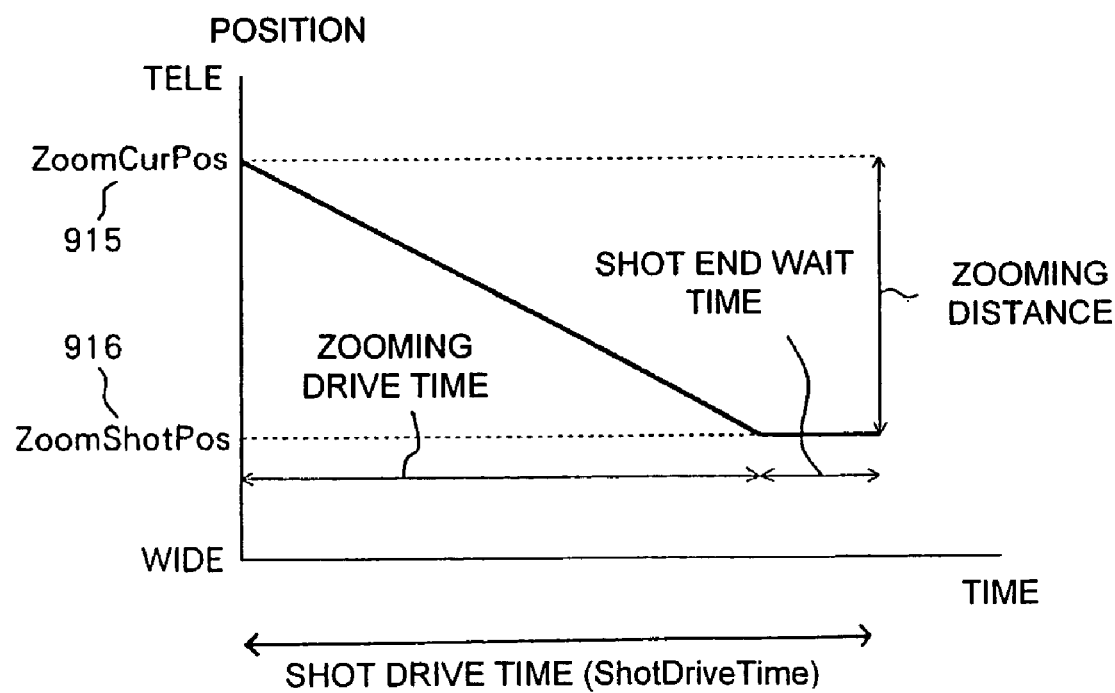

That is to say, when zooming in the telephoto direction, the zooming operation starts from the shot start position after the zooming wait time has elapsed, as shown in FIG. 37A, but when zooming in the wide-angle direction, then, in order to acquire more video information, zooming in the wide-angle direction is given preference and the end of the shot operation is awaited in the shot position, as shown in FIG. 37B.

It should be noted that the shorter the waiting time for the shot operation end is, the closer the system comes to synchronized shot operation. In this case, the selection of the zooming speed (speed command value) that minimizes the waiting time at the shot operation end is the same as in the method for selecting the zooming speed minimizing the zooming wait time in Embodiment 1.

Figure 38:
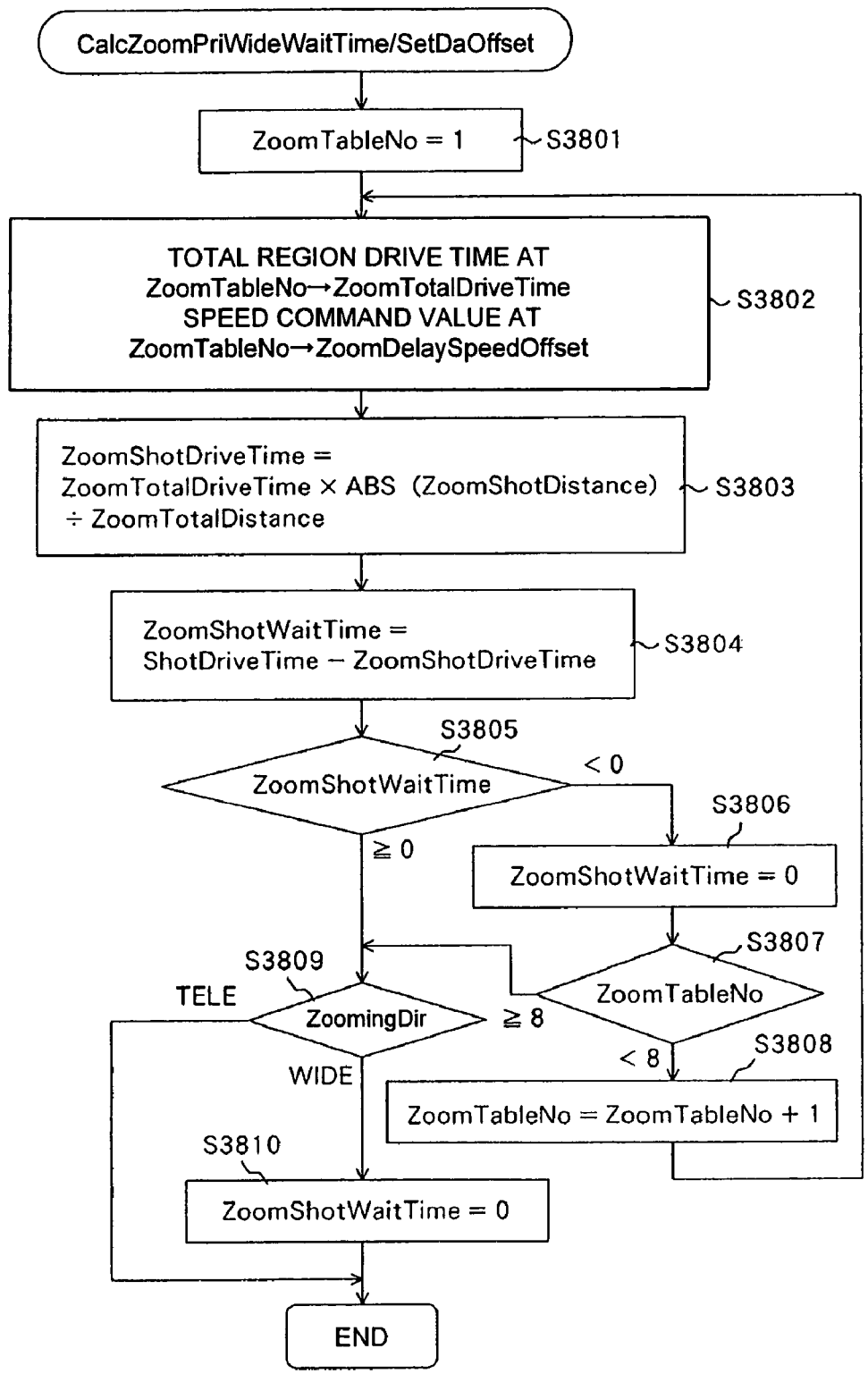
FIG. 38 is a flowchart of a wide-angle prioritizing zooming wait time calculation/D/A offset setting subroutine according to Embodiment 2.

Referring to FIG. 38, the following is a description of a wide-angle prioritizing zooming wait time calculation/D/A offset setting subroutine (CalcZoomPriWideWaitTime/SetDaOffset) for calculating the zooming shot end waiting time giving priority to wide angles, and setting the D/A offset value.

This subroutine is called and processed instead of the zooming wait time calculation/offset setting subroutine (CalcZoomWaitTime/SetDaOffset) shown in FIG. 33.

First, at Step 3801, the table number is initialized in order to search the zooming speed table.

ZoomTableNo=1

Then, the subroutine advances to Step 3802.

At Step 3802, the total region drive time corresponding to ZoomTableNo is read from the zooming speed table, and ZoomTotalDriveTime is set to this value.

Similarly, ZoomDelaySpeedOffset is set to the speed command value corresponding to ZoomTableNo. Then, the subroutine advances to Step 3803.

At Step 3803, the zooming drive time (anticipated operation time) ZoomShotDriveTime is calculated with Expression (34):

$$ZoomShotDriveTime = ZoomTotalDriveTime \times ABS(ZoomShotDistance)/ZoomTotalDistance \quad (34)$$

Here, ABS(x) is a function calculating the absolute value of x. Moreover, the number of driving pulses over the total zoom region ZoomTotalDistance is ZoomTotalDistance=5000. Then, the subroutine advances to Step 3804.

At Step 3804, the zooming wait time ZoomShotWaitTime is calculated using Expression (35) from the zooming drive time ZoomShotDriveTime and the shot drive time (target operation time) ShotDriveTime.

$$ZoomShotWaitTime = ShotDriveTime - ZoomShotDriveTime \quad (35)$$

Then, the subroutine advances to Step 3805.

At Step 3805, the sign of the zooming wait time ZoomShotWaitTime is checked. If ZoomShotWaitTime$\geq$0, then the subroutine advances to Step 3809. On the other hand, if ZoomShotWaitTime<0, then the subroutine advances to Step 3806, and ZoomShotWaitTime is set to ZoomShotWaitTime=0. Then, the subroutine advances to Step 3807.

At Step 3807, ZoomTableNo is checked to determine whether the search of the zooming speed table has been finished or not. If ZoomTable$\geq$8, then the search of the zooming speed table has finished, and the subroutine advances to Step 3809. If ZoomTableNo<8, then the search of the zooming speed table has not yet finished, and the subroutine advances to Step 3808.

At Step 3808, the table number is incremented in order to set the next table number:

ZoomTableNo=ZoomTableNo+1

Then, the subroutine returns to Step 3802.

At Step 3809, the zooming drive direction is checked. If ZoomingDir=TELE, then the subroutine ends. If ZoomingDir=WIDE, then the waiting time is set to 0 (ZoomShotWaitTime=0). Thus, zooming in the wide-angle direction starts immediately after the shot operation start command, and the end of the other shot operations (the passing of the shot drive time ShotDriveTime) is awaited in a state in which the zooming already has finished. Then, the subroutine ends.

Embodiment 3

Figure 39:
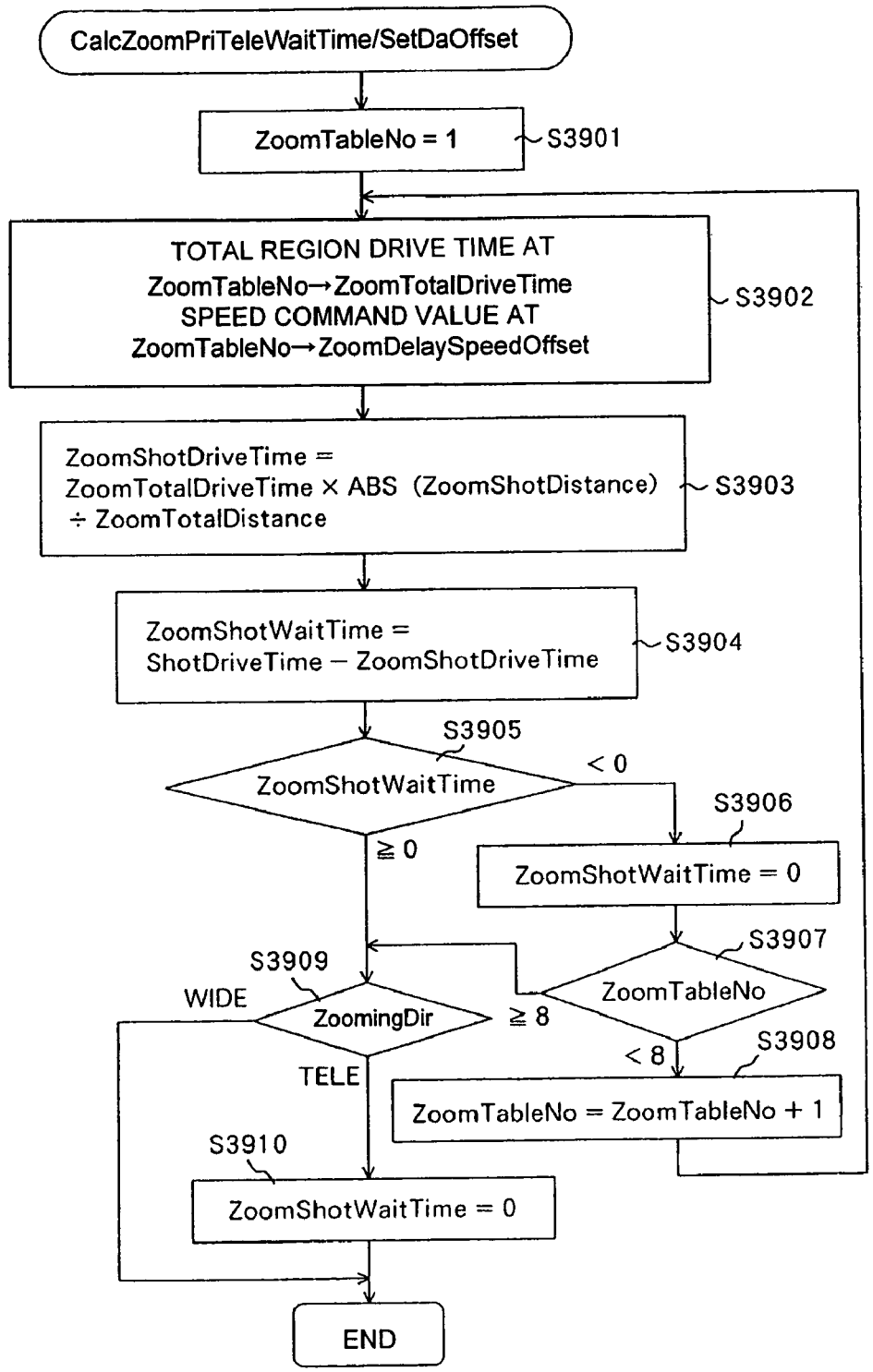
FIG. 39 is a flowchart of a telephoto prioritizing zooming wait time calculation/D/A offset setting subroutine according to Embodiment 3 of the present invention.

Embodiment 2 was explained for the case that the zooming shot operation is started at the same time as the other shot operations when zooming in the wide-angle direction, but there are also cases in which it is advantageous when the shot operation gives higher priority to a telephoto field angle than to a wide-angle field angle. For example, there are cases in which one wants, as soon as possible, to take an enlarged video image of a shot position to which the camera is moved. Referring to FIG. 39, the following is a description of a telephoto prioritizing zooming wait time calculation/D/A offset setting subroutine (CalcZoomPriTeleWaitTime/SetDaOffset) for performing the processing for this case.

This subroutine is called and processed instead of the zooming wait time calculation/offset setting subroutine (CalcZoomWaitTime/SetDaOffset) shown in FIG. 33.

First, at Step 3901, the table number is initialized in order to search the zooming speed table.

ZoomTableNo=1

Then, the subroutine advances to Step 3902.

At Step 3902, the total region drive time corresponding to ZoomTableNo is read from the zooming speed table, and ZoomTotalDriveTime is set to this value. Similarly, ZoomDelaySpeedOffset is set to the speed command value corresponding to ZoomTableNo. Then, the subroutine advances to Step 3903.

At Step 3903, the zooming drive time (anticipated operation time) ZoomShotDriveTime is calculated with Expression (36):

$$ZoomShotDriveTime = ZoomTotalDriveTime \times ABS(ZoomShotDistance)/ZoomTotalDistance \quad (36)$$

Here, ABS(x) is a function calculating the absolute value of x. Moreover, the number of driving pulses over the total zoom region ZoomTotalDistance is ZoomTotalDistance=5000. Then, the subroutine advances to Step 3904.

At Step 3904, the zooming wait time ZoomShotWaitTime is calculated using Expression (37) from the zooming drive time ZoomShotDriveTime and the shot drive time (target operation time) ShotDriveTime. Then, the subroutine advances to Step 3805.

$$ZoomShotWaitTime = ShotDriveTime - ZoomShotDriveTime \quad (37)$$

At Step 3905, the sign of the zooming wait time ZoomShotWaitTime is checked. If ZoomShotWaitTime$\geq$0, then the subroutine advances to Step 3909. On the other hand, if ZoomShotWaitTime<0, then the subroutine advances to Step 3906, and ZoomShotWaitTime is set to ZoomShotWaitTime=0. Then, the subroutine advances to Step 3907.

At Step 3907, ZoomTableNo is checked to determine whether the search of the zooming speed table has been finished or not. If ZoomTableNo≧8, then the search of the zooming speed table has finished, and the subroutine advances to Step 3909. If ZoomTableNo<8, then the search of the zooming speed table has not yet finished, and the subroutine advances to Step 3908.

At Step 3908, the table number is incremented in order to set the next table number:

ZoomTableNo=ZoomTableNo+1

Then, the subroutine returns to Step 3902.

At Step 3909, the zooming drive direction is checked. If ZoomingDir=WIDE, then the subroutine ends. If ZoomingDir=TELE, then the waiting time is set to 0 (ZoomShotWaitTime=0). Thus, zooming in the telephoto direction starts immediately after the shot operation start command, and the end of the other shot operations (the passing of the shot drive time ShotDriveTime) is awaited in a state in which the zooming already has finished. Then, the subroutine ends.

The embodiments described above have been described for the case that the shot operation is performed by position control, and this control method employs a speed control method according to ramp commands. However, it is also possible to apply the present invention to speed control while detecting the panning, tilting, zooming and focusing positions, that is, to control by a speed feedback system.

Moreover, if a shot operation is performed only for zooming, without concurrent focusing, panning or tilting, then it is possible to immediately start the zooming at the zooming speed minimizing the shot operation end waiting time, after the shot operation start command, regardless of telephoto direction and wide-angle direction. This is in order to avoid that there is a time during which the video information on the monitor does not change at all, when there is a shot operation start waiting time.

Moreover, the foregoing embodiments were explained for the case that the bit number of the A/D converters and D/A converters is sixteen or eight bits, but it is also possible to use A/D converters and D/A converters with other bit numbers.

Moreover, the foregoing embodiments were explained for the case that driving with a pulse motor and pseudo-synchronized shot operation is performed only for zooming, but it is similarly possible to perform a pseudo-synchronized shot operation also for focusing, panning or tilting.

Moreover, the number of levels in the zooming speed table was eight, but there may also be a different number of levels besides eight.

With the foregoing embodiments as explained above, it is possible to let drivable parts (first drivable parts) for which it is not possible to select an operation speed allowing simultaneous operation start and simultaneous operation end with other drivable parts perform an operation that is close to the characteristics of simultaneous operation start and simultaneous operation end.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An image-taking control apparatus controlling a first and second drivable parts of an image-taking device, such that operations of the drivable parts from their current positions to their target positions finish substantially simultaneously, the image-taking control apparatus comprising:

a speed selector selecting an operation speed for each of the drivable parts, based on information on its current position, information on its target position, and information on a target operation time from a start command time at which an operation start of the drivable parts is commanded until the respective operations to the target positions finish; and a controller performing such control that each of the drivable parts operates at its operation speed selected by the speed selector;

wherein the operation speed of the first drivable part can be selected only in steps, and the operation speed of the second drivable part can be selected in non-steps;

wherein the speed selector selects a specific operation speed for the first drivable part from selectable operation speeds of the first drivable part, the specific operation speed being an operation speed at which the operation to the target position can finish within the target operation time; and wherein the controller calculates an anticipated operation time needed until the operation of the first drivable part to its target position at the specific operation speed finishes, and lets the operation of the first drivable part start when a waiting time corresponding to a time difference between the anticipated operation time and the target operation time has passed after the start command time in a case where the anticipated operation time is not matched to the target operation time.

2. The image-taking control apparatus according to claim 1, wherein the first and second drivable parts of the image-taking device are drivable parts related to changes in zoom, focus and image-taking direction.

3. The image-taking control apparatus according to claim 1, wherein the speed selector selects for the first drivable part, of the selectable operation speeds, an operation speed at which the time difference becomes shortest.

4. The image-taking control apparatus according to claim 1, wherein the speed selector selects for the first drivable part, of the selectable operation speeds, an operation speed at which the time difference becomes longest.

5. The image-taking control apparatus according to claim 1, wherein the controller sets the waiting time to zero regardless of the time difference when the controller lets the first drivable part perform an operation such that an image-taking field angle is changed toward a wide-angle side.

6. The image-taking control apparatus according to claim 1, wherein the controller sets the waiting time to zero regardless of the time difference when the controller lets the first drivable part perform an operation such that an image-taking field angle is changed toward a telephoto side.

7. An image-taking system, comprising:

the image-taking control apparatus according to claim 1; and the image-taking device including the first and second drivable parts.

8. The image-taking system according to claim 7, wherein the image-taking device comprises a camera whose image-taking field angle and focusing state can be changed, and a pan head supporting the camera and capable of a panning and a tilting operation.

9. An image-taking system, comprising:

the image-taking control apparatus according to claim 1;

the image-taking device including the first and second drivable parts; and an input device with which information specifying the target positions and the target operation time can be input into the image-taking control apparatus.

\* \* \* \* \*